US010095799B2

(12) United States Patent
Corriere et al.

(10) Patent No.: US 10,095,799 B2
(45) Date of Patent: *Oct. 9, 2018

(54) METHOD AND SYSTEM FOR PROVIDING CONDITION REPORTS FOR VEHICLES

(71) Applicant: CLEAR VIEW TECHNOLOGY SOLUTIONS, INC., Orange, CA (US)

(72) Inventors: Joseph R. Corriere, Orange, CA (US); Brian M. Schear, Orange, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/331,054

(22) Filed: Oct. 21, 2016

(65) Prior Publication Data

US 2017/0039207 A1 Feb. 9, 2017

Related U.S. Application Data

(63) Continuation of application No. 14/549,454, filed on Nov. 20, 2014, now Pat. No. 9,478,080.

(51) Int. Cl.
*G06F 17/30* (2006.01)
*G07C 5/08* (2006.01)
*G07C 5/00* (2006.01)
*G01M 17/00* (2006.01)

(52) U.S. Cl.
CPC .... *G06F 17/3089* (2013.01); *G06F 17/30864* (2013.01); *G07C 5/008* (2013.01); *G07C 5/0816* (2013.01)

(58) Field of Classification Search
CPC .......... G06F 17/3089; G06F 17/30864; G07C 5/008; G07C 5/0816
USPC ....................................... 701/29.1
See application file for complete search history.

(56) References Cited

U.S. PATENT DOCUMENTS

| 8,230,362 | B2 | 7/2012 | Couch |
| 9,147,296 | B2 | 9/2015 | Ricci |
| 9,478,080 | B2 * | 10/2016 | Corriere ............... G07C 5/0816 |
| 2011/0270707 | A1 | 11/2011 | Breed et al. |

(Continued)

OTHER PUBLICATIONS

Sharp, Brett and Farell, Harriet, National Auto Auction Association Condition Reports Evaluation, National Auto Auction Association, 2012, pp. 1-15.

*Primary Examiner* — Gertrude Arthur Jeanglaude
(74) *Attorney, Agent, or Firm* — The Law Office of Austin Bonderer, PC; Austin Bonderer

(57) ABSTRACT

A method of providing a condition report for a vehicle using a mobile device including a display includes constructing a plurality of condition report sections using a condition report application database residing in a cloud based server service and infrastructure to process requests from the mobile device including: capturing data, on the mobile device, for constructing at least one condition report section of the plurality of condition report sections; and accessing, from the mobile device, a condition report document database and/or a condition report images database residing in the cloud based server service and infrastructure for constructing and storing the plurality of condition report sections. The method includes providing user input indicative that the plurality of condition report sections have been completed, and providing user input indicative of a decision to publish the completed condition report sections as the condition report for the vehicle. The published condition report is viewable by a party by an Internet accessible web browsing device.

16 Claims, 24 Drawing Sheets

(56) References Cited

U.S. PATENT DOCUMENTS

| | | |
|---|---|---|
| 2012/0209564 A1 | 8/2012 | Pfanstiehl |
| 2012/0246036 A1 | 9/2012 | Marr et al. |
| 2014/0306833 A1 | 10/2014 | Ricci |
| 2015/0100504 A1 | 4/2015 | Binion |

* cited by examiner

FIG. 8

80 ↘
71 — General Information
81a → Vehicle Identification
- Year: 2011
- Make: Subaru
- Model: Impreza Wagon
- Style/Trim: 5dr Auto 2.5i Premium w/ Pwr MR Pkg & TomTom Nav
- VIN: JF1GH61BH804202
- Market Class: Small Wagon
- Body Type: Station Wagon
- Drive:
- Passenger Doors: 4
- Base Price Invoice:
- Base Price MSRP:
- Build Date:
- Stock Image URL: http://media.carbook.com/autoBuilderData/stockPhotos/14000.jpg

FIG. 9

90 ↘
71 — General Information 4:00
81b → Vehicle Colors
- Exterior Color Name: Camellia Red Pearl
- Interior Color Name: Carbon Black
- Paint Type: Clear Coat / 2 Stage 81c → Engine Information
- Liters: 2.5
- Cylinders: 4
- Horsepower: 170
- Torque: 170
- Drive Type: Front Wheel Drive
- Fuel Type: Gasoline Fuel
- MPG City: 20
- MPG Highway: 26
- Trransmission: Automatic Transmissi...

81d → Auction Information
- Work Order ID: 123456789
- Dealer ID: 543210
- Dealer Name: West Coast Subaru

FIG. 10

100 ↘
71 — General Information 4:00
81d → Auction Information
- Work Order ID: 123456789
- Dealer ID: 543210
- Dealer Name: West Coast Subaru
- Lane Number: 12
- Run Number: 42
- Lot Location: A12
- Auction Announcement: AS-IS NO WARRANTY
- Condition Report Grade: 4.9

81e → Odometer Information
- Odometer Miles: 57,622
- Digital Odometer
- Working Odometer 81f → Documents
- Owners Manual
- Maintenance Book
- Warranty Book
- EPA Label

FIG. 11

110 ↘
71 — General Information 5:00
81f → Key Code Card
81g → Keys
- Number of Keys: 3
- Number of Remote Key Fobs: 2
- Keyless Entry 81h → General Vehicle Condition
- Engine Starts
- Driveable
- Interior Odor: Odor - None
- Oil Condition: Oil - Normal 81i → Spare Tire
- Spare Tire Included
- Spare Tire is Mini
- Spare Tire Jack and Tools
- Spare Tire is Locked
- Tire Lock Key Available I have completed the General Information section. [ Save ] ← 115

- 71 — General Information
- 121 — Exterior Color Name
  - Camellia Red Pearl
  - Dark Gray Metallic
  - Marine Blue Pearl
  - Obsidian Black Pearl
  - Paprika Red Pearl
  - Satin White Pearl
  - Sky Blue Metallic
  - Spark Silver Metallic
- Auction Information
- Work Order ID

- 71 — General Information  1:00
- 122 — Interior Color Name
  - Carbon Black
  - Ivory
- Auction Information
- Work Order ID

- 71 — General Information  1:00
- 131 — Paint Type
  - Clear Coat / 2 Stage
  - Single Stage / 1 Stage
- Auction Information
- Work Order ID

- 71 — General Information  1:00
- Paint Type ▪ Clear Coat / 2 Stage
- 141 — Transmission
  - Automatic Transmission (AT)
  - Manual Transmission (MT)
  - Automated Manual Transmission (AM)
  - Continuously Variable Transmission (CVT)
- Lot Location

FIG. 15

150 — General Information 1:00
151 — Drive Type
- Front Wheel Drive
- Rear Wheel Drive
- All Wheel Drive
- Four Wheel Drive Auction Information
Work Order ID

FIG. 16

160 — General Information 5:00
161 — Interior Odor
- Odor - None
- Odor - Foul
- Odor - Moldy
- Odor - Musty
- Odor - Smoker Spare Tire is Locked
Tire Lock Key Available

FIG. 17

170 — General Information 5:00
171 — Oil Condition
- Oil - Normal
- Oil - Dirty
- Oil - Sludge
- Oil - Low
- Oil - Overfill Spare Tire is Locked
Tire Lock Key Available

FIG. 18

180 — General Information 1:00

Key Code Card

81i — Keys
Number of Keys 3
Number of Remote Key Fobs 2
Keyless Entry

General Vehicle Condition
Engine Starts
— 183
Save and Complete
Save General Information category?
Yes   No Spare Tire
Spare Tire Included
Spare Tire is Mini
Spare Tire Jack and Tools
Spare Tire is Locked
Tire Lock Key Available I have completed the General Information section. [Save] — 115

FIG. 65 — 650: Edit Tire - GENERAL, Tire Width: 255, 265, 275, 285, 295, 305, 315, 325, 335, 345, 355, 375, 395

FIG. 66 — 660: Edit Tire - GENERAL, Tire Ratio: 20, 25, 30, 35, 40, 45, 50, 55, 60, 65, 70, 75, 80

FIG. 67 — 670: Edit Tire - GENERAL, Tire Type: R, B, D

FIG. 68 — 680: Edit Tire - GENERAL, Tire Diameter: 10, 12, 13, 14, 15, 16, 16.5, 17, 17.5, 18, 19, 19.5, 20

690

Edit Tire - GENERAL ✖
Tire Tread ✖
- 1/32
- 2/32
- 3/32
- 4/32
- 5/32
- 6/32
- 7/32
- 8/32
- 9/32
- 10/32
- 11/32
- 12/32
- 13/32

Edit Tire - GENERAL ✖
Tire Manufacturer ✖
- BF Goodrich
- Bridgestone
- Continental
- Cooper
- Dunlap
- Firestone
- General
- Goodyear
- Kelly
- Michelin
- Pirelli
- Toyo
- Uniroyal

Edit Tire - GENERAL ✖
Tire Damage ✖
- No Damage
- Cupped
- Cut
- Gouged
- Flat
- Hole
- Mismatched
- Missing
- Plugged
- Punctured
- Remove / Install
- Separated
- Side Wall Bulge

Edit Tire - GENERAL ✖
Tire Condition ✖
- Average
- Good
- New
- Poor

METHOD AND SYSTEM FOR PROVIDING CONDITION REPORTS FOR VEHICLES

CROSS-REFERENCE TO RELATED APPLICATIONS

The instant application is a Continuation of Ser. No. 14/549,454 filed on Nov. 20, 2014.

STATEMENT RE: FEDERALLY SPONSORED RESEARCH/DEVELOPMENT

Not Applicable

BACKGROUND

Technical Field

The present disclosure relates generally to vehicle purchasing. More particularly, the present disclosure relates to methods, systems and devices for providing condition reports for used vehicles.

Discussion of Related Art

Many vehicles, such as automobiles, boats, all-terrain vehicles, motorcycles, sports vehicles, etc. come into the possession of auto dealers, financial institutions and/or other businesses and companies after having, in some cases, at least one previous owner. Generally, these vehicles are accumulated and resold by car dealers, wholesalers, vehicle auctions run by third parties, and the like.

When a vehicle is designated for sale, the vehicle seller needs to communicate details to potential buyers. Before listing a vehicle for sale, the seller or a third party may prepare vehicle condition information to share with potential buyers. Condition information/reports, which may record details about the exterior, interior, mechanical and electrical systems, available options, and the book and market value of the vehicle, may be categorized as seller prepared reports, auction prepared reports, or condition specialist ("third-party") prepared reports.

Typically, before purchasing a vehicle, a buyer researches and considers potential purchases, e.g., reviews web postings from car dealerships, wholesalers, auction companies, etc., to narrow down considered vehicles by reviewing condition information/reports. In general, condition information determines which vehicles are considered.

CarFax and AutoCheck produce and sell vehicle history reports on individual vehicles. The reports are comprised of history data gathered from insurance companies, state motor vehicle departments and other sources. A major limitation of vehicle history reports comprised of data from insurance companies and motor vehicle departments is that such data often inaccurately describes the vehicle's current condition and/or damage. These reporting techniques do not address normal wear and tear, minor collisions, scrapes, and paint damage when an insurance company does not pay for the repairs. As one example, private owners sometimes pay for repair of damage out of pocket to avoid increases in insurance rates. Additionally, large companies with fleets, such as rental car companies being one common example, often self-insure and/or repair their vehicles.

Due to the major limitation of CarFax and AutoCheck vehicle history reports, professional buyers or consumers visually inspect millions of used vehicles. Millions of vehicles are driven or shipped by truck to auction sites where buyers can visually inspect them.

Sellers want to have condition reports that will help them sell more cars. Buyers want to have condition reports to save them time by having reliable and comprehensive information from the start. Buyers seek objective, detailed, consistent, and unbiased reporting; however, current condition reports may only partially meet their needs.

There is a need in the art to improve how condition reports are used and generated.

BRIEF SUMMARY

The various aspects and features described herein address the needs discussed above, discussed below and those that are known in the art. A method, system and device for providing a condition report for a vehicle are disclosed. The device may be a tablet computer (e.g., iPad) that can be used by the vehicle inspector to record information about a used vehicle for sale. In order to make the vehicle information available to others as soon as possible, the tablet computer may be in communication with Internet-based cloud server services and infrastructure for uploading to the cloud based server services and infrastructure in the background as the inspector takes his or her time gathering data on the used vehicle. The tablet computer may access a condition report application database on a cloud-based server service and infrastructure to process requests from the tablet computer and lead the inspector through a series of screen views providing data entry fields, switch selector icons, prompts, etc. that help the inspector to aggregate all of the relevant information without missing any information that might be necessary to make a smart buying decision. The vehicle information aggregated by the inspector may include a variety of different formats, e.g., textual and numerical data, digital voice recordings, images, video, and multimedia format. The data being aggregated on the used vehicle is typically large because quality digital images are usually large in file size. If a voice recording is associated with the used vehicle, then the audio file from the digital voice recorder may represent a large portion of the data associated with the used vehicle for sale. As the inspector captures each digital photograph, the image data is associated with a particular field within the condition report document database and uploaded to a condition report images database. In this regard, the digital image files are uploaded to the condition report images database in the background as the inspector takes the photographs of the used vehicle at various picture angles. When the inspector is ready to allow for publication of the condition report, all of the images have already been uploaded or a majority of the images have been uploaded to the condition report images database so that the buyers may have access to the published condition report as soon as or shortly after the inspector has captured all the data for the condition report. The condition report may include one or more condition report sections, e.g., a general information section, an images section, a standard equipment section, a factory options section, an aftermarket section, a damage section, a paint meter section, a tires section, and/or a publish section.

According to an aspect of the present disclosure, a method of providing a condition report for a vehicle using a mobile device including a display is provided. The mobile device is communicatively coupled to the Internet. The mobile device interoperates with server services and infrastructure to perform the method. The method includes constructing a plurality of condition report sections using a condition report application database residing in a cloud based server service and infrastructure to process requests from the mobile device including: capturing data, on the mobile device, for constructing at least one condition report section of the plurality of condition report sections; and accessing, from the mobile device, either one or both of a condition report document database residing in the cloud based server service and infrastructure and a condition report images database residing in the cloud based server service and infrastructure for constructing and storing the plurality of condition report sections. The method also includes providing user input indicative that the plurality of condition report sections have been completed, and providing user input indicative of a decision to publish the completed condition report sections as the condition report for the vehicle. The published condition report is viewable by one or more parties by an Internet accessible web browsing device.

According to an aspect of the present disclosure, a method of providing a condition report for a vehicle using a mobile device including a display is provided. The mobile device is communicatively coupled to the Internet. The mobile device interoperates with server services and infrastructure to perform the method. The method includes: determining whether to create a new condition report for an authenticated user; if it is determined that a new condition report is to be created, then receiving vehicle identification information from the mobile device; and performing a vehicle identification process using the received vehicle identification information. The vehicle identification process includes identifying a manufacturer of the vehicle. The method also includes; if it is determined that the manufacturer of the vehicle introduced multiple vehicle models, then applying a unique model version characteristics algorithm and displaying on the display of the mobile device available model versions with unique characteristics; if user input indicative of correct model version has been received, then constructing a plurality of condition report sections using a condition report application database residing in a cloud based server service and infrastructure to process requests from the mobile device; determining whether the plurality of condition report sections have been completed; and publishing the completed condition report sections as the condition report for the vehicle. The published condition report is viewable by one or more parties by an Internet accessible web browsing device.

BRIEF DESCRIPTION OF THE DRAWINGS

Objects and features of the presently-disclosed method of providing a condition report for a vehicle over a computer network is provided will become apparent to those of ordinary skill in the art when descriptions of various embodiments thereof are read with reference to the accompanying drawings, of which:

FIG. 8 is a display screen view of general information input in accordance with an embodiment of the present disclosure;

FIG. 9 is a display screen view of general information input in accordance with another embodiment of the present disclosure;

FIG. 10 is a display screen view of general information input in accordance with another embodiment of the present disclosure;

FIG. 11 is a display screen view of general information input in accordance with another embodiment of the present disclosure;

FIG. 12A is a display screen view of general information/list exterior colors in accordance with an embodiment of the present disclosure;

FIG. 12B is a display screen view of general information/list interior colors in accordance with an embodiment of the present disclosure;

FIG. 13 is a display screen view of general information/list paint type in accordance with an embodiment of the present disclosure;

FIG. 14 is a display screen view of general information/list transmission in accordance with an embodiment of the present disclosure;

FIG. 15 is a display screen view of general information/list drive type in accordance with an embodiment of the present disclosure;

FIG. 16 is a display screen view of general information/list interior odor in accordance with an embodiment of the present disclosure;

FIG. 17 is a display screen view of general information/list oil condition in accordance with an embodiment of the present disclosure;

FIG. 18 is a display screen view of general information/save begin confirmation in accordance with an embodiment of the present disclosure;

FIG. 19A is a display screen view of general information/save completed in accordance with an embodiment of the present disclosure;

FIG. 19B is a display screen view of the top-level menu of FIG. 7A with a vehicle images section selected in accordance with an embodiment of the present disclosure;

FIG. 20 is a display screen view of vehicle images input/images pending in accordance with an embodiment of the present disclosure;

Figures 57, 58, 59, 60:
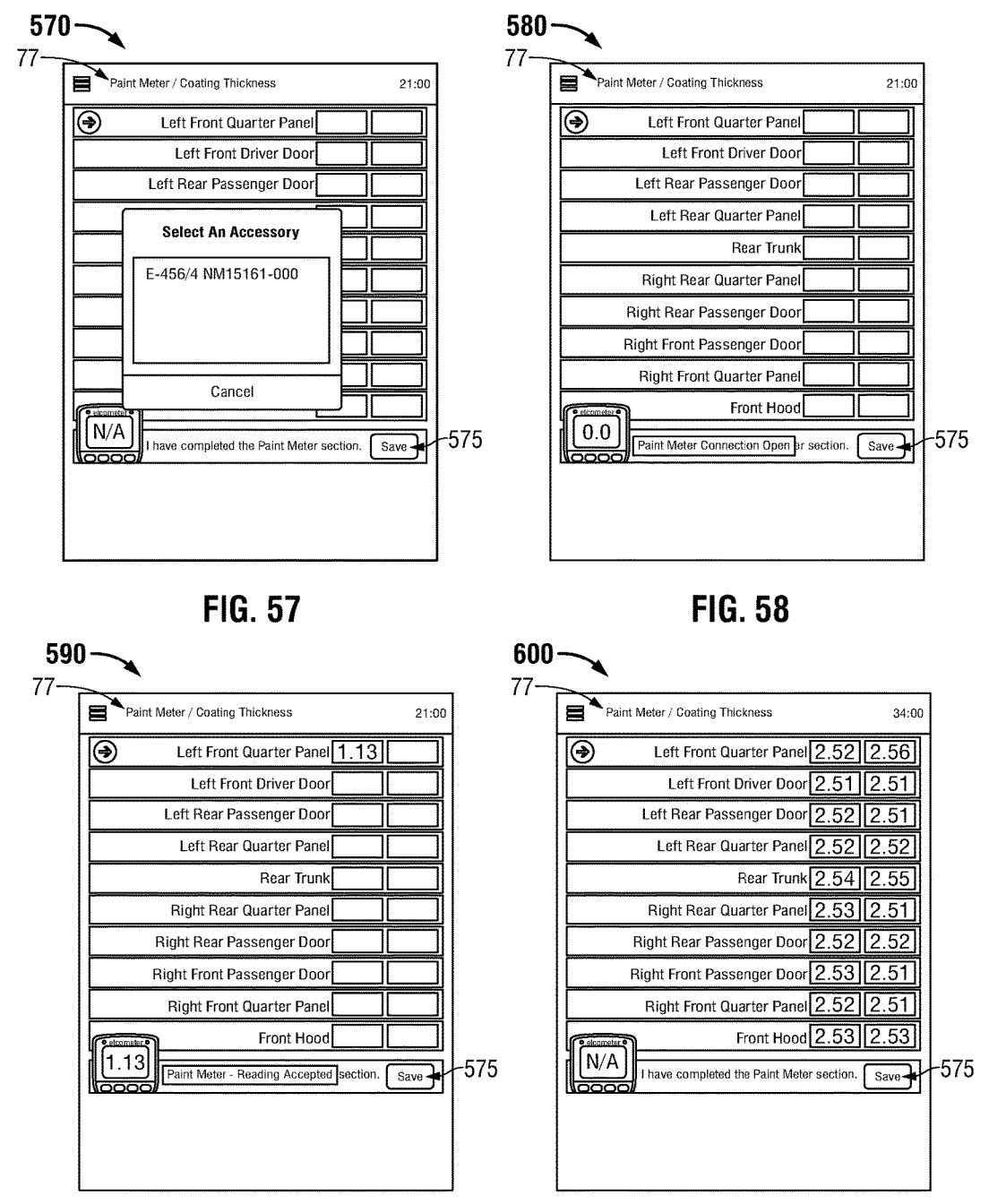

FIG. 57 is a display screen view of vehicle coating thickness input/wireless gauge connection begin in accordance with an embodiment of the present disclosure;

FIG. 58 is a display screen view of vehicle coating thickness input/wireless gauge connection completed in accordance with an embodiment of the present disclosure;

FIG. 59 is a display screen view of vehicle coating thickness input/wireless gauge reading accepted in accordance with an embodiment of the present disclosure;

FIG. 60 is a display screen view of vehicle coating thickness input/input completed in accordance with an embodiment of the present disclosure;

FIG. 61 is a display screen view of vehicle coating thickness input/save begin confirmation in accordance with an embodiment of the present disclosure;

FIG. 62 is a display screen view of vehicle coating thickness input/save completed in accordance with an embodiment of the present disclosure;

FIG. 63 is a display screen view of vehicle tires input in accordance with an embodiment of the present disclosure;

FIG. 64 is a display screen view of vehicle tires input/edit tire record begin in accordance with an embodiment of the present disclosure;

FIG. 65 is a display screen view of vehicle tires input/edit tire width list in accordance with an embodiment of the present disclosure;

FIG. 66 is a display screen view of vehicle tires input/edit tire ratio list in accordance with another embodiment of the present disclosure;

FIG. 67 is a display screen view of vehicle tires input/edit tire type list in accordance with another embodiment of the present disclosure;

FIG. 68 is a display screen view of vehicle tires input/edit tire diameter list in accordance with another embodiment of the present disclosure;

FIG. 69 is a display screen view of vehicle tires input/edit tire tread list in accordance with another embodiment of the present disclosure;

FIG. 70 is a display screen view of vehicle tires input/edit tire manufacturer list in accordance with another embodiment of the present disclosure;

FIG. 71 is a display screen view of vehicle tires input/edit tire damage list in accordance with another embodiment of the present disclosure;

FIG. 72 is a display screen view of vehicle tires input/edit tire condition list in accordance with another embodiment of the present disclosure;

FIG. 77 is a display screen view of vehicle tires input/save begin confirmation in accordance with an embodiment of the present disclosure;

FIG. 78 is a display screen view of vehicle tires input/save completed in accordance with an embodiment of the present disclosure;

DETAILED DESCRIPTION

Figure 1:
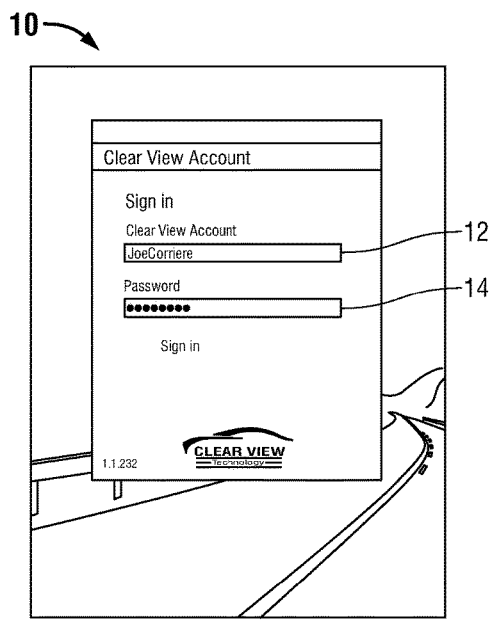
FIG. 1 is a display screen view of user authentication/login in accordance with an embodiment of the present disclosure.

A method and system for creating and publishing a condition report for a used vehicle is described herein. The published condition report is available immediately after the inspection is completed or shortly thereafter since the data being transferred from an inspector's mobile device, e.g., a tablet computer, to databases hosted on a cloud based server service and infrastructure occurs while the inspector is inspecting the used vehicle for sale. As such, the method and system does not wait for the inspector to aggregate all of the digital images and data on the used vehicle for sale to begin uploading such data to the databases hosted on the cloud based server service and infrastructure. Reference to the cloud is in relation to cloud computing which one or more remote servers are networked to allow the centralized storage of data, and online access to computer services and resources. The information accessible from the cloud may be public, private or hybrid.

Hereinafter, embodiments of a method and system for providing a condition report for a vehicle over a computer network are described with reference to the accompanying drawings. Like reference numerals may refer to similar or identical elements throughout the description of the figures.

This description may use the phrases "in an embodiment," "in embodiments," "in some embodiments," or "in other embodiments," which may each refer to one or more of the same or different embodiments in accordance with the present disclosure.

The term "online data entry" generally refers to performing a set of specific tasks, usually involving typing of textual or numerical data into online web based applications or servers. As it is used herein, "online data entry" or, simply, "data entry," is a general term that may involve typing of textual and/or numerical data, activation of switch selector icons, and other acts of introducing data into applications, servers, databases, etc. hosted on the cloud based server service and infrastructure.

Various embodiments of the present disclosure provide a method of creating, storing, and publishing a condition report for a vehicle. Embodiments of the presently-disclosed method of providing a condition report for a vehicle provide vehicle identification and detailed model selection techniques that help to eliminate the incidence of errors and omissions that occur in the field. Embodiments of the presently-disclosed method of providing a condition report for a vehicle use a mobile device with an integrated camera, an Internet connection, and software hosted on the cloud based server service and infrastructure to enable the user to quickly create comprehensive condition reports. Embodiments of the presently-disclosed method of providing a condition report for a vehicle are suitable for the automotive remarketing industry, while various alternative embodiments may be suitable for a wide range of industries.

Embodiments of the presently-disclosed method of providing a condition report for a vehicle may be implemented in software, and may be delivered by IT infrastructure with high reliability and enterprise-grade security that provides software and data over high availability geo-redundant back-end cloud based infrastructure. In accordance with various embodiments of the present disclosure, by using software hosted on the cloud based server service and infrastructure, users are able to quickly create detailed condition reports from a user device.

As will be appreciated by one of ordinary skill in the art, the present disclosure may be embodied as a method, a data processing system, a device for data processing, and/or a computer program product. Accordingly, the present disclosure may take the form of an entirely software embodiment, an entirely hardware embodiment, or an embodiment combining aspects of both software and hardware. The present disclosure may take the form of a computer program product on a computer-readable storage medium having computer-readable program code means embodied in the storage medium. Any suitable computer-readable storage medium may be utilized, including hard disks, CD-ROM, DVD-ROM, USB mass storage devices, Flash storage devices, optical storage devices, magnetic storage devices, semiconductor storage devices, and/or the like.

The present disclosure is described below with reference to block diagrams and flowchart illustrations of methods, apparatus (e.g., systems), and computer program products according to various aspects of the disclosure. It will be understood that each functional block of the block diagrams and the flowchart illustrations, and combinations of functional blocks in the block diagrams and flowchart illustrations, respectively, can be implemented by computer program instructions. These computer program instructions may be loaded onto a general-purpose computer, special purpose computer, mobile device or other programmable data processing apparatus to produce a machine, such that the instructions that execute on the computer or other programmable data processing apparatus create means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, functional blocks of the block diagrams and flowchart illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems that perform the specified functions or steps, or suitable combinations of special purpose hardware and computer instructions.

Figure 82:
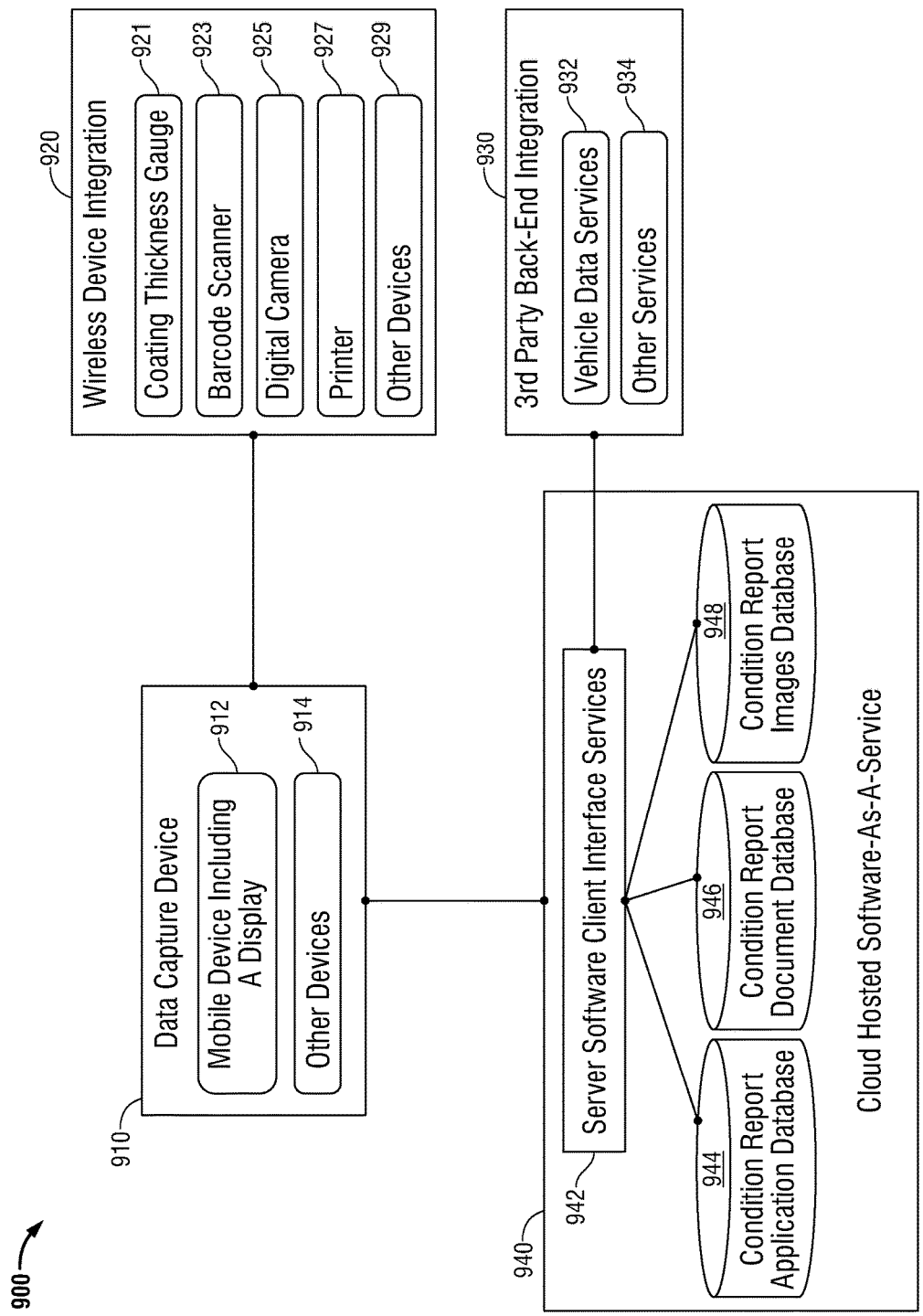
FIG. 82 is a diagram of a system in accordance with an embodiment of the present disclosure.

FIG. 82 shows a system 900 for carrying out the vehicle condition reporting process in accordance with an embodiment of the present disclosure. The system 900 may be used to implement the method of providing a condition report for a vehicle as described herein with reference to FIG. 83.

As illustratively depicted in FIG. 82, the system 900 includes a data capture device 910 (also referred to herein as "user device 910") and server services and infrastructure 940, and may include one or more external user device accessories 920. The user device 910 generally includes a processor and memory associated with the processor. The user device 910 is communicatively coupled to the server services and infrastructure 940. In some embodiments, the user device 910 may include a device that offers some type of Internet connectivity feature (e.g., WiFi, 4G, LTE, or the like). The user device 910 may be a mobile device 912 including a display, e.g., a personal digital assistant (e.g., a Blackberry, a Palm Pilot, a Windows Mobile device or the like) or a messaging enabled communication device, or other devices 914 capable of processing instructions and receiving and transmitting data to and from users and other computing devices. The user device 910 may be a wireless tablet device (e.g., Apple iPad, Microsoft Surface, Google Nexus, or the like), a wireless phone (e.g., an Apple iPhone, Nokia Lumina, Samsung Galaxy, a feature phone, a smart phone, or the like), a portable computer (e.g., a laptop, netbook, notepad computer, Apple iPad, palmtop computer or the like), an ebook reader (e.g., Amazon Kindle, Barnes and Noble Nook, Sony ebook reader or the like), a portable media player (e.g., Apple iPod or the like). The other devices 914 may be a desktop computer (e.g., a PC-compatible, an Apple Macintosh, or the like) or other suitable computing device. The user device 910 may include an integrated or an externally-connected camera. In general, any computing device capable of being programmed to perform the method and user device functions in accordance with the present disclosure and as described herein can be used.

The server services and infrastructure 940 may include one or more server devices, or other types of computation and/or communication devices, that process, store, retrieve and/or provide information.

Persons using the condition reporting process use the user device 910. Upon performing a vehicle condition report, the user may supply one or more external accessories 920 to capture data input in conjunction with software on the user device 910. The external accessories 920 may include a variety of components and devices. In some embodiments, a vehicle condition reporting software process implements data capture by way of technology integration bridges. The external accessories 920 may include a wireless Coating Thickness Gauge 921 (e.g., Elcometer 456 Integral Coating Thickness Gauge), an wireless Laser Barcode Scanner 923 (e.g., Unitech MS840B), a wireless Digital Camera 925, (e.g., Samsung CL80), a wireless Printer 927 (e.g., Star Micronics SM-T300i), and/or Other Devices 929 (e.g., PAPAGO GSBT500-US TPMS 500BT Bluetooth Tire Pressure Monitor System, or Sensorcon Sensordrone SDRO-NEG1 Environmental Tricorder).

The user device 910 interoperates with the server services and infrastructure 940 in order to perform the vehicle condition reporting process. Proprietary Server Software Client Interface Services 942 interfaces with users in order to authenticate and process user requests. Requests made by the user device 910 may include creation, editing, reading, researching, and/or storing vehicle condition report data captured by and/or requested by the user device software.

Server Software Client Interface Services 942 may implement third party back-end integration services 930 in order to process a user request. In some embodiments, the third party back-end integration services may include Vehicle Data Services 932, (e.g., Chrome Data Web Services, or Mitchell International Data Licensing, and Other Services 934 (e.g., Kelly Blue Book, InfoDriver Web Service, or the like)).

Server Software Client Interface Services 942 implements back-end server databases and infrastructure in order to process a user request. In some embodiments, the databases include a Condition Report Application Database 944 used to store data required by the user device software in order to operate, a Condition Report Document Database 946 used to store data collected through the user device and software, and a Condition Report Images Database 948 used to store images collected through the user device 910 and software.

Hereinafter, a method of providing a condition report for a vehicle in accordance with the present disclosure is described with reference to FIG. 83. It is to be understood that the functional blocks of the method provided herein (shown generally as 1000 in FIG. 83) may be performed in combination and in a different order than presented herein without departing from the scope of the disclosure.

In block 1010, user authentication is performed. User authentication may include user login and password authentication using a secure Internet connection. FIG. 1 shows a user authentication/login screen 10 including a user name entry field 12 and a password entry field 14. In some embodiments, user authentication, in block 1010, includes assigning a special token lease to the authenticated user to publish photos to the cloud based server service and infrastructure.

Figure 2:
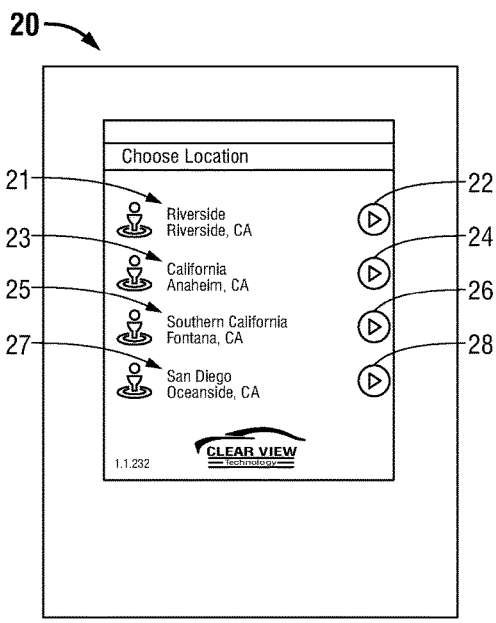
FIG. 2 is a display screen view of user authentication/choose location in accordance with an embodiment of the present disclosure.

In block 1020, the user selects or confirms a physical location from a list of locations. FIG. 2 shows a choose location screen 20. In the illustrative example shown in FIG.

2, four different locations 21, 22, 23 and 24 are listed. A user-selectable icon 22, 24, 26 and 28 is displayed next to each of the locations 21, 22, 23 and 24, respectively. In other embodiments, during user authentication, in block 1010, the location may be automatically associated with the user, e.g., the location may be pre-set for a particular user (or user group), or the location may be filtered or otherwise determined based on user-profile information and/or other information such as auction location, current location, vehicle owner, remarketing location or customer preference, etc.

Figure 3:
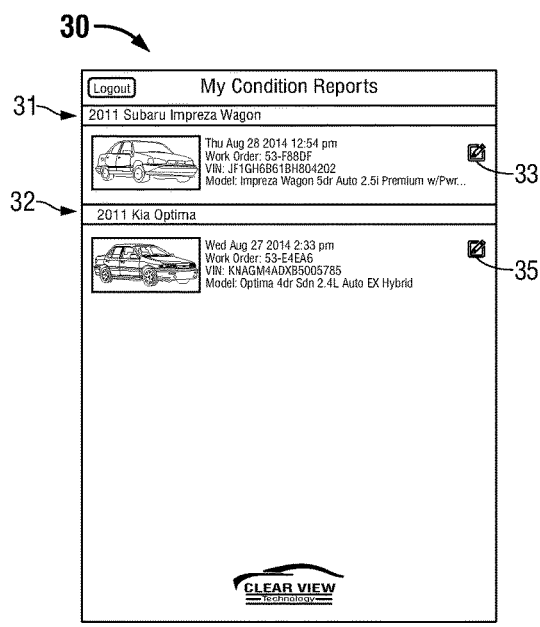
FIG. 3 is a display screen view of user authentication/recent condition reports in accordance with an embodiment of the present disclosure.

After user authentication, in block 1010, a determination is made whether there are any existing (e.g., recent, unpublished, incomplete, and/or pending) condition reports for the user to review, in block 1025. In some embodiments, if it is determined that one or more condition reports exist for the authenticated user, then the existing condition report(s) are displayed on the user display, in block 1930. FIG. 3 shows a recent condition reports screen 30. In the illustrative example shown in FIG. 3, two existing condition reports 31 and 32 are displayed below a heading of "My Condition Reports." A user-selectable icon 33 and 35 is displayed next to each of the condition reports 31 and 32, respectively.

In other embodiments, if it is determined that one or more condition reports exist for the authenticated user, then a determination is made whether an existing condition report is for the location associated with the user. If it is determined that one or more condition reports exist at the location associated with the (authenticated) user, then, in block 1030, said condition report(s) are displayed on the user display.

Figure 7A:
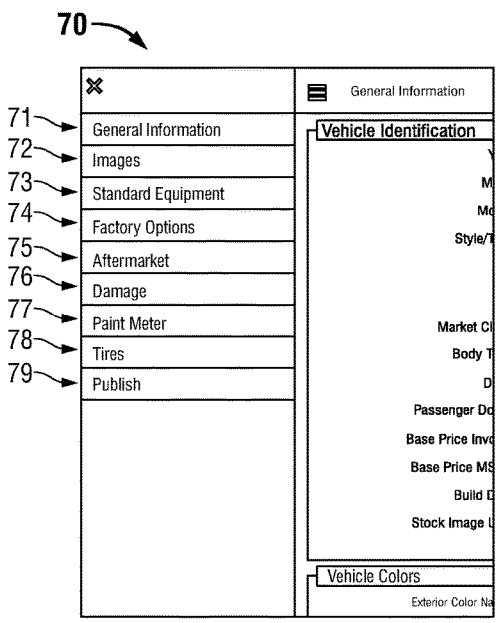
FIG. 7A is a display screen view of a top-level menu for user selection of a condition report section in accordance with an embodiment of the present disclosure.

In block 1035, a determination is made whether user input indicative of the selection of an existing condition report has been received. If it is determined, in block 1035, that user input indicative of the selection of an existing condition report has been received, then, in block 1070, an edit condition report screen (e.g., screen 70 shown in FIG. 7A) is displayed on the user display. FIG. 7A shows a top-level menu for user selection of a condition report section. In the illustrative example shown in FIG. 7A, the user may select from the following condition reporting process sections: General Information section 71; Images section 72; Standard Equipment section 73; Factory Options section 74; Aftermarket section 75; Damage section 76; Paint Meter section 77; Tires section 78; and Publish section 79. Alternatively, the top-level menu can include additional, fewer, or different sections than shown in FIG. 7A.

General Information section 71 embodiments are intended for use to capture information from the user regarding the vehicle for which the condition report is being performed upon. As can be appreciated, a variety of layouts and data field options may be used to capture a variety of information, e.g., relating to vehicle characteristics used to identify the specific vehicle, vehicle colors, vehicle engine specifications, auction information, odometer readings, vehicle documentation, vehicle keys, spare tire specifications, and the general vehicle condition. The information captured within this section is generally considered within the vehicle re-marketing industry to be of high value to potential buyers in the decision-making process. Although an embodiment of the General Information section 71 is described in detail later in this description with reference to FIGS. 8-19A, other embodiments may also be used.

Images section 72 embodiments are intended for use to capture vehicle images of exterior and interior aspects of the vehicle for which the condition report is being performed upon. Images form a large percentage of the raw data being used in the condition report. As a result, in order to expedite availability of the condition report, the image data is uploaded to the condition report images database as the images are being taken. The uploading of the images to the condition report images database does not take place at the end of the inspection but while the inspection is occurring so that upon completion of the inspection, the raw data of the images is completely uploaded to the condition report images database or near completion. In an illustrative embodiment shown in FIG. 20, the images of exterior aspects of the vehicle include: Exterior Rear 204a, Exterior Right Rear Corner 204b, Exterior Right Side 204c, Exterior Right Front Corner 204d, Exterior Front 204e, and Exterior Left Front Wheel 204f. The process of capturing vehicle images within Images section 72 is performed in a specific order by following a path defined by the condition reporting process for a particular vehicle. In some embodiments, certain images may be required, and other images may be optional, e.g., as defined by the condition reporting process and/or end user preferences. As can be appreciated, considering that not all vehicles contain the same components, the process of capturing vehicle images may take a variety of paths. Moreover, as the images are being taken, each image is associated with a particular field in the condition report document database so that the inspector need not download each of the images and manually associate each of the images to the particular field in the condition report document database. This tool also aids in facilitating expedited access to the condition report upon completion of the inspection.

It should be appreciated that images capture by the Images section 72 condition reporting process may be attained using any suitable technology, e.g., a camera integrated into the user device or by communication with a digital camera external to the user device. If the camera is external to the user device, then the camera may be Wi-Fi or Bluetooth enabled so that the camera and the user device may communicate with each other and allow the images taken by the external camera to be uploaded to the condition report images database in real time or as the images are being taken. In some embodiments, the captured images are stored with additional metadata, e.g., geo-location, date, time, vehicle location, vehicle component name, and/or description. Additionally, or alternatively, the captured images may be stored and/or published to cloud based server service and infrastructure (e.g., cloud based infrastructure 940 shown in FIG. 82), external to the user device. Although an embodiment of the Images section 72 is described in detail later in this description with reference to FIGS. 19B-27, other embodiments may also be used.

Standard Equipment section 73 embodiments are intended for use to capture information from the user regarding the standard equipment installed on the vehicle for which the condition report is being performed upon. Standard Equipment section 73 may be used to capture a variety of information, e.g., exterior, interior, mechanical, entertainment and safety equipment. Although an embodiment of the Standard Equipment section 73 is described in detail later in this description with reference to FIGS. 28-33, other embodiments may also be used.

Factory Options section 74 embodiments are intended for use to capture information from the user regarding the factory options installed on the vehicle for which the condition report is being performed upon. Factory Options section 74 may be used to capture a variety of information, e.g., paint, color, option package, option group, exterior, interior, mechanical, entertainment and safety options. Although an embodiment of the Factory Options section 74 is described in detail later in this description with reference to FIGS. 34-38, other embodiments may also be used.

Aftermarket section 75 is intended for use to capture information from the user regarding the aftermarket equipment and features installed on the vehicle for which the condition report is being performed upon. It is expected that the aftermarket equipment and features recorded in the Aftermarket section 75 were installed on the vehicle after the vehicle was produced and sold by a manufacturer and/or dealer. Although an embodiment of the Aftermarket section 75 is described in detail later in this description with reference to FIGS. 39-44, other embodiments may also be used.

Damage section 76 is intended for use to capture information from the user regarding the identifiable damage on the vehicle for which the condition report is being performed upon. It is expected that the damages recorded in the Damage section 76 are identifiable either by sight or procedure performed by persons of ordinary skill. Although an embodiment of the Damage section 76 is described in detail later in this description with reference to FIGS. 45-56, other embodiments may also be used.

Paint Meter section 77 is intended for use to capture multiple coating-thickness gauge meter readings that correspond to one or more exterior areas of the vehicle for which the condition report is being performed upon. In some embodiments, the Paint Meter section 77 condition reporting process may receive vehicle coating-thickness gauge meter readings from the user and/or integrated wireless coating-thickness gauge device. Paint Meter section 77 may be used to capture coating thickness gauge meter readings for a variety of areas, e.g., left front bumper, left front driver door, left rear passenger door, left rear quarter panel, rear trunk, right rear quarter panel, right rear passenger door, right front passenger door, right front bumper, front hood, and roof top. The information captured within this section is generally considered within the vehicle re-marketing industry to be of high value to potential buyers in the decision-making process. Although an embodiment of the Paint Meter section 77 is described in detail later in this description with reference to FIGS. 57-62, other embodiments may also be used. A coating thickness gauge (e.g., paint meter) may be used to capture the data to be input into the paint meter section 77. The coating thickness gauge may be a Wi-Fi or Bluetooth enabled device that communicates with the user device. The inspector may place a cursor at a particular data field of the paint meter section 77. When the coating thickness gauge reads a thickness of the vehicle coating or paint, the data is inserted into that particular data field. The data is uploaded to the condition report document database 946 when the inspector is finished with the paint meter section 77 or when the cursor is placed at the next data field. Beneficially, the readings of the paint meter need not be later downloaded and associated with particular field but is associated with the particular field at the time of measurement.

Tires section 78 is intended for use to capture vehicle tire condition data from the user for the vehicle for which the condition report is being performed upon. In some embodiments, within this condition reporting process the method of capturing detailed information for each vehicle tire is performed first by capturing data for a Default Tire condition. Data captured for the Default Tire is then applied to all other vehicle tires where "Using Default Tire Condition" is true. Tires section 78 may capture a variety of detailed tire condition information, e.g., the default tire, left front tire, left rear tire, right front tire, and right rear tire. Although an embodiment of the Tires section 78 is described in detail later in this description with reference to FIGS. 63-78, other embodiments may also be used.

Publish section 79 performs validation steps to ensure required condition report sections have been completed, verification data has been collected, and provides a method for the condition report data to be "published" to an area where the final completed condition report may be viewed by public or private parties by an Internet accessible web browsing device. Publish section 79 displays visual indicators and information to the user to indicate which condition reporting sections have been completed and which have not, for the vehicle for which the condition report is being performed upon. Although an embodiment of the Publish section 79 is described in detail later in this description with reference to FIGS. 79-81, other embodiments may also be used.

Figure 4:
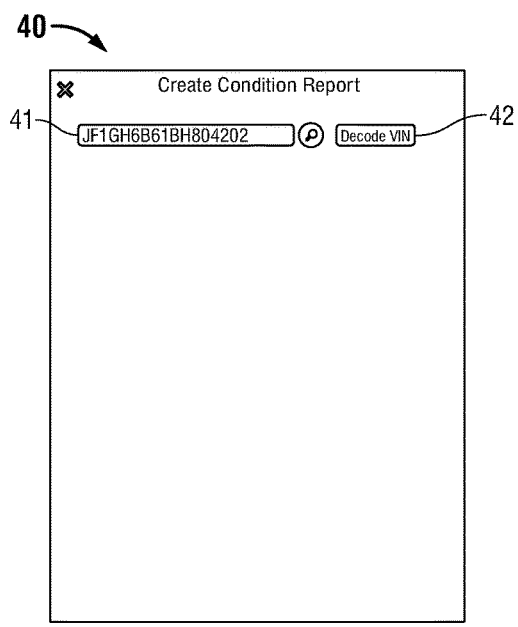
FIG. 4 is a display screen view of create new condition report/enter VIN in accordance with an embodiment of the present disclosure.
Figure 5:
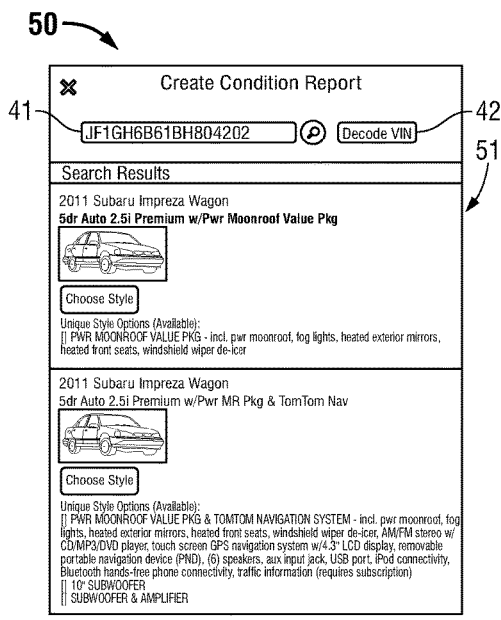
FIG. 5 is a display screen view of create new condition report/select model style in accordance with an embodiment of the present disclosure.
Figure 6:
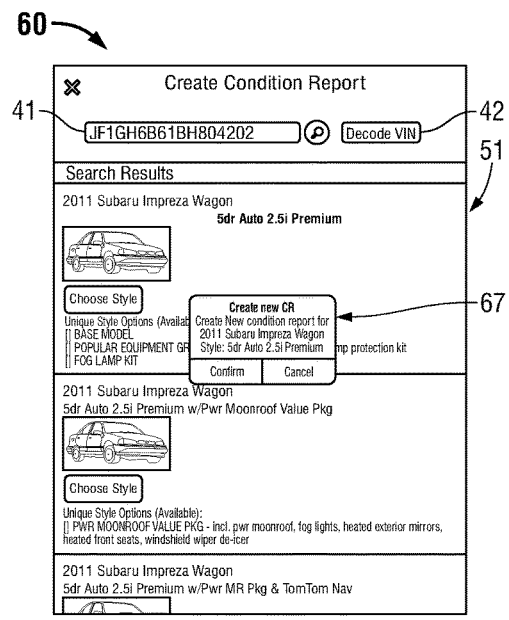
FIG. 6 is a display screen view of create new condition report/confirm model style in accordance with an embodiment of the present disclosure.
Figure 83:
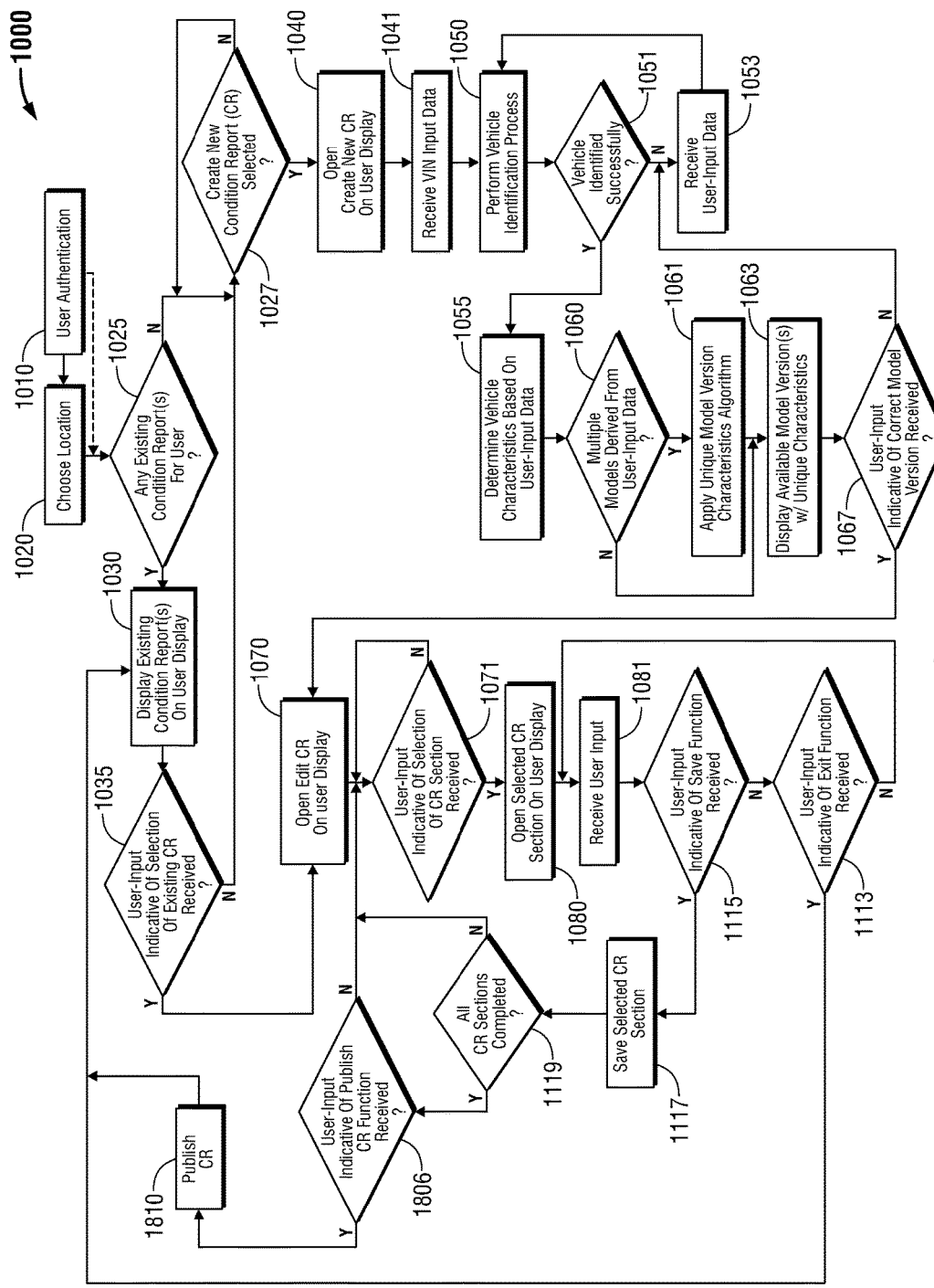
FIG. 83 is a flowchart illustrating a method of providing a condition report for a vehicle over a computer network in accordance with an embodiment of the present disclosure.

As shown in FIG. 83, if it is determined, in block 1035, that it is determined that user input indicative of the selection of an existing condition report has not been received, then, in block 1027, a determination is made whether to create a new condition report. In some embodiments, if it is determined, in block 1025, that there is no existing condition report for the user, then, in block 1040, a create new condition report screen (e.g., "Create Condition Report" screen 40 shown in FIG. 4) is automatically displayed on the user display. In some embodiments, as shown for example in FIG. 4, the Create Condition Report screen 40 includes a VIN entry field 41 and a Decode VIN icon 42.

In block 1041, the vehicle identification number (VIN) is received. For example, the user enters the VIN in the VIN entry field 41 of the Create Condition Report screen 40, and the user selects the Decode VIN icon 42. In addition, or alternatively, in some embodiments other vehicle identification information, e.g., year, make, model, feature, body and/or trim may be used.

In block 1050, a vehicle identification process is performed using the VIN. In block 1051, a determination is made whether the vehicle was identified successfully. If it is determined, in block 1051, that the vehicle was identified successfully, then, in block 1055, vehicle characteristics are determined based on the user-input data. User-input data may include year, make, model, feature, body, trim, and/or other data. In some embodiments, if it is determined that the vehicle was not identified successfully, then, in block 1053, additional user-input data is received (and the process returns to block 1050).

In block 1060, a determination is made whether multiple models are derived from the user-input data. If it is determined that multiple models are not derived from the user-input data, then, in block 1063, the available model version with unique characteristics is displayed on the user display. Otherwise, if it is determined that multiple models are not derived from the user-input data, then, in block 1063, the available model version with unique characteristics is displayed on the user display. Otherwise, if it is determined, in block 1060, that multiple models are derived from the user-input data, then, in block 1061, a unique model version characteristics algorithm is applied. The unique model version characteristics algorithm is a data processing method implemented within the condition reporting process. The algorithm is a component of the vehicle model identification procedure which produces data used by vehicle inspectors ("end users") to accurately classify a vehicle by trim and/or style. Applied to a particular vehicle identification, the algorithm performs an elimination process upon all characteristics available to each trim and/or style offered by the vehicle manufacturer. By way of example and not limitation, the elimination process as a first step determines which associates features for each of the trims or styles A, B, C. Trim A may have features 1, 4, 5 and 6. Trim B may have features 2, 4, 5, 6 and 7. Trim C may have features 3, 4, 5 and 7. If there are any common feature(s) between any two of the trims or styles, then that feature(s) is not unique to that trim or style and that feature(s) is not used as a distinguishing characteristic of any particular trim or style. In the example provided, features 4 and 5 are common to Trims A, B and C. Feature 6 is common to both Trims A and B. Feature 7 is common to both Trims B and C. The remaining features for each of the trims A, B and C are used to identify the trim. The presence of feature 1 is used to identify Trim A. The presence of feature 2 is used to identify Trim B. The presence of feature 3 is used to identify Trim C. Although in this description, the presence of a feature identifies the trim or style, it is also contemplated that the absence of a feature can be used to identify the trim or style. In our example, the absence of feature 7 may be used to identify Trim A. The absence of feature 6 may be used to identify Trim C. In this manner, the algorithm produces uniquely identifying data/characteristics for each trim and/or style of any model offered by a vehicle manufacturer. This data processing method implemented within the condition reporting process may significantly increase accuracy of classifying a vehicle by trim and/or style. After the unique model version characteristics algorithm has been applied, in block 1061, the available model versions with unique characteristics are displayed on the user display, in block 1063.

In block 1067, a determination is made whether user input indicative of the correct model version has been received. If it is determined, in block 1067, that user input indicative of the correct model version has been received, then, in block 1070, an edit condition report screen (e.g., screen 70 shown in FIG. 7A) is displayed on the user display.

Figure 7B:
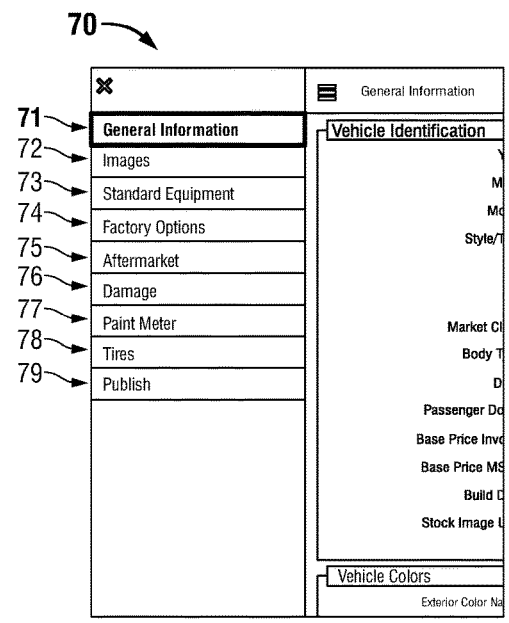
FIG. 7B is a display screen view of the top-level menu of FIG. 7A with a general information section selected in accordance with an embodiment of the present disclosure.
Figures 19A, 19B, 20:
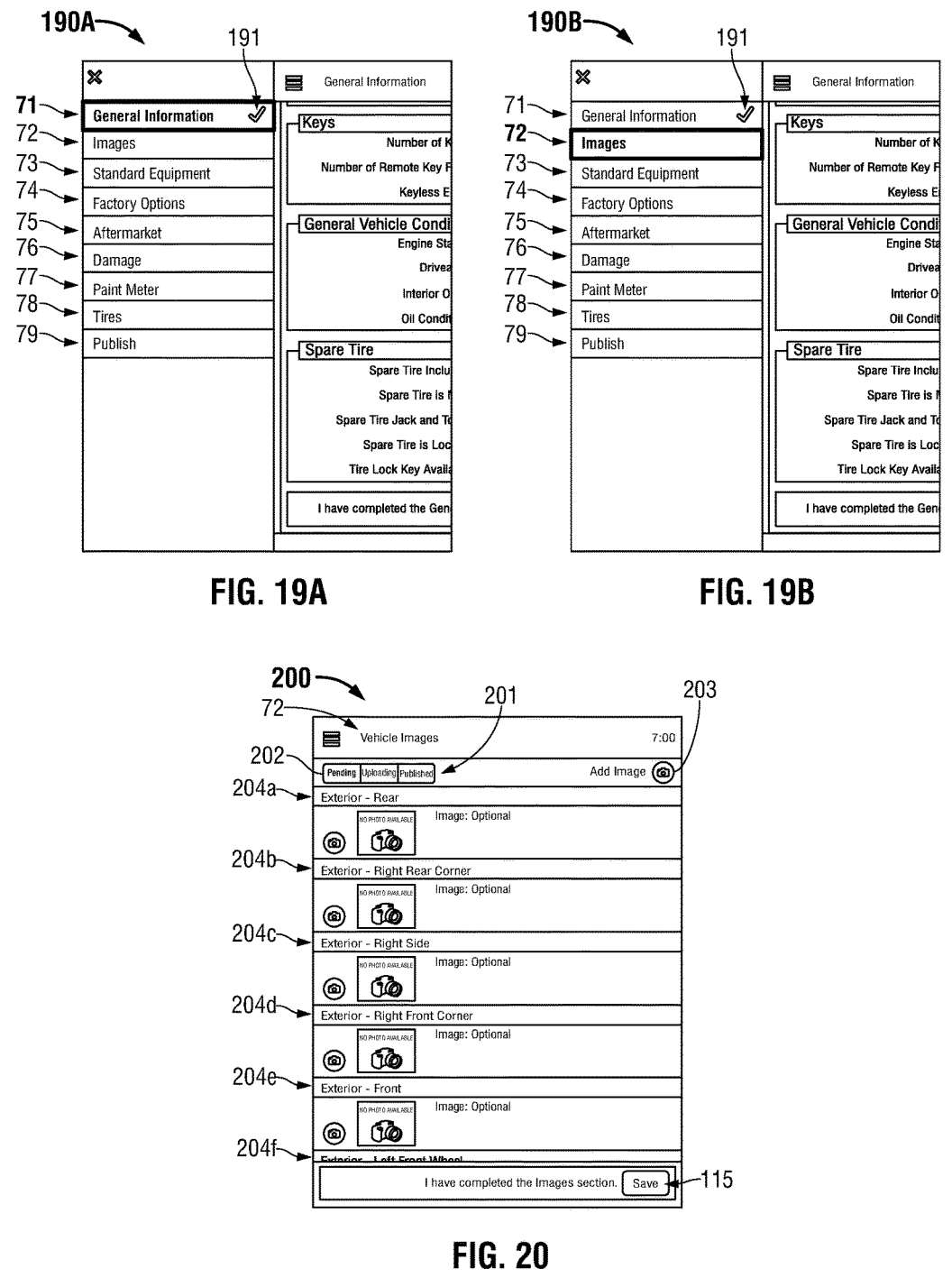
Figures 21, 22:
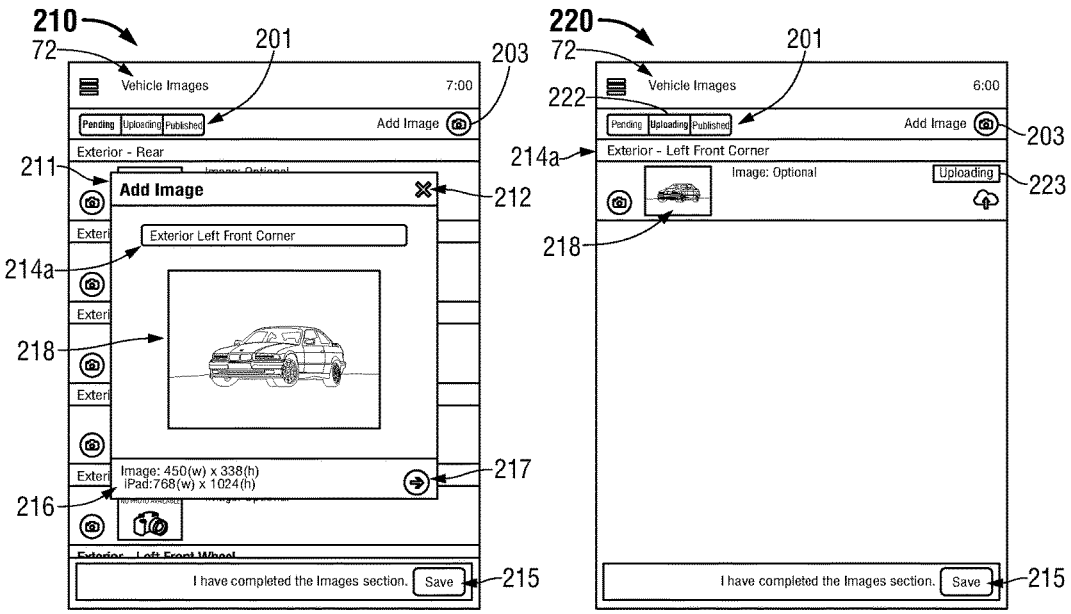
FIG. 21 is a display screen view of vehicle images input/add image in accordance with an embodiment of the present disclosure.
FIG. 22 is a display screen view of vehicle images input/image uploading in accordance with an embodiment of the present disclosure.
Figures 23, 24:
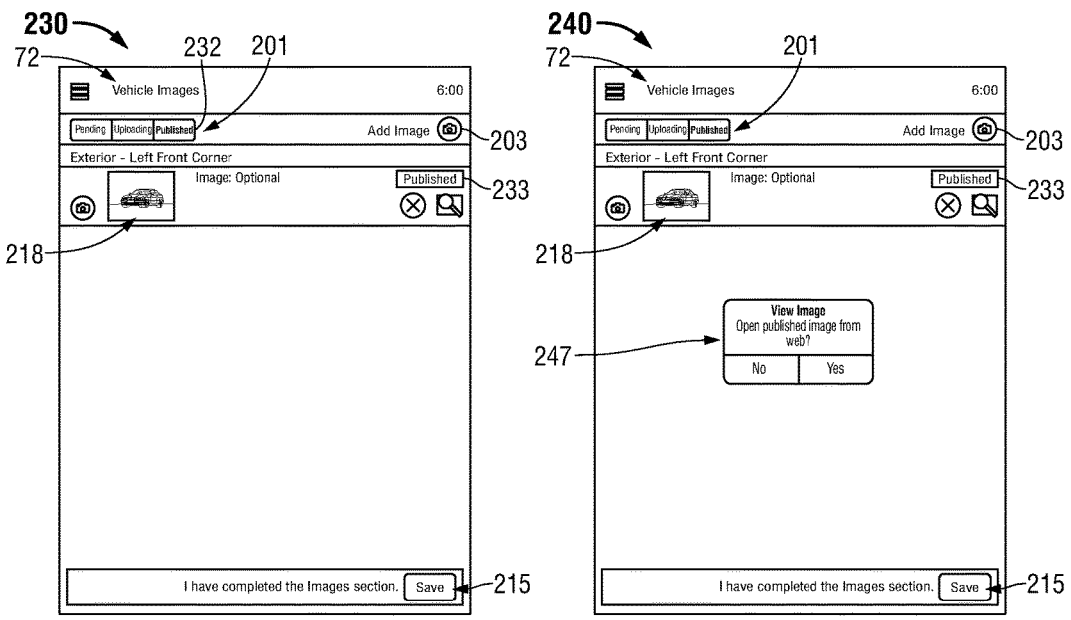
FIG. 23 is a display screen view of vehicle images input/image published in accordance with an embodiment of the present disclosure.
FIG. 24 is a display screen view of vehicle images input/begin open published image in accordance with an embodiment of the present disclosure.
Figure 25:
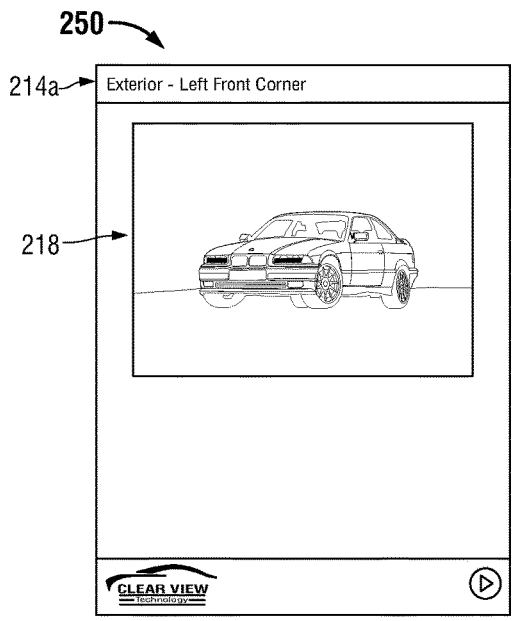
FIG. 25 is a display screen view of vehicle images input/published image displayed in accordance with an embodiment of the present disclosure.

In block 1071, a determination is made whether user input indicative of the selection of a condition report section has been received. In accordance with an embodiment of the present disclosure, the user may select from the following sections: General Information section 71; Images section 72; Standard Equipment section 73; Factory Options section 74; Aftermarket section 75; Damage section 76; Paint Meter section 77; Tires section 78; and Publish section 79. In some embodiments, as shown for example in FIGS. 7B and 19B, the selected condition report section is indicated by bold text and bold borders on the top-level menu.

If it is determined, in block 1071, that user input indicative of the selection of a condition report section has been received, then, in block 1080, the selected condition report section is displayed on the user display. Otherwise, if it is determined that user input indicative of the selection of a condition report section has not been received, then (loop) when it is determined that user input indicative of the selection of a condition report section has been received, then the selected condition report section is displayed on the user display, in block 1080. In some embodiments, the method 1000 may display a default section if user input is not received.

If the selected condition report section is displayed on the user display, then, in block 1081, user input is received. In block 1115, a determination is made whether user input indicative of the save function has been received. If it is determined, in block 1115, that user input indicative of the selection of an existing condition report has been received, then, in block 1117, the selected condition report section is saved. Otherwise, if it is determined that user input indicative of the save function has not been received, then, in block 1113, a determination is made whether user input indicative of the exit function has been received.

If it is determined, in block 1113, that user input indicative of the exit function has been received, then, in block 1030, the existing condition report(s) are displayed on the user display device. If it is determined that user input indicative of the exit function has not been received, then return to block 1081 to receive user input.

If the selected condition report section is saved, then, in block 1119, a determination is made whether all of the condition report sections are completed. If it is determined, in block 1119, that all of the condition report sections are completed, then, in block 1806, a determination is made whether user input indicative of the publish condition report function has been received. Otherwise, if it is determined that all of the condition report sections are not completed, then, return to block 1071, wherein a determination is made whether user input indicative of the selection of a condition report section has been received.

If it is determined, in block 1806, that user input indicative of the publish condition report function has been received, then, publish the condition report, in block. 1810 (and return to block 1030). Otherwise, if it is determined that user input indicative of the publish condition report function has not been received, then, return to block 1071.

General Information Section 71

User completion of the General Information section 71, in accordance with an embodiment shown in FIGS. 8-19B, generally involves the Items 71-1 through 71-12, below. It is to be understood that the screen layouts and data field options may be varied from the screen 80, 90, 100, 110, 120A, 120B, 130, 140, 150, 160, 170, 180, 190A and 190B configurations shown in FIGS. 8-19B.

Item 71-1. Complete the Vehicle Identification 81*a* data entry group by performing data entry and/or review of any pre-populated data entry fields (FIG. 8).

Item 71-2. Complete the Vehicle Colors 81*b* data entry group by performing data entry and/or review of any pre-populated data entry fields (FIG. 9). Data entry may be performed by selection from lists (e.g., Exterior Color Name list 121 shown in FIG. 12A, Interior Color Name list 122 shown in FIG. 12B, and Paint Type list 131 shown in FIG. 13). In some embodiments, as shown for example in FIG. 9, user-selectable icons adjacent the data entry fields may be selected to display the lists.

Item 71-3. Complete the Engine Information 81*c* data entry group by performing data entry and/or review of any pre-populated data entry fields (FIG. 9). Data entry may be performed by selection from lists (e.g., Transmission list 141 shown in FIG. 14 and Drive Type list 151 shown in FIG. 15), which are displayed upon selecting the icon adjacent the data entry field (FIG. 9).

Item 71-4. Complete the Auction Information 81*d* data entry group by performing data entry and/or review of any pre-populated data entry fields. In some embodiments, as shown for example in FIGS. 9 and 10, the Auction Information 81*d* data entry group includes: Work Order ID; Dealer ID; Dealer Name; Lane Number; Run Number; Lot Location, Auction Announcement; and Condition Report Grade.

Item 71-5. Complete the Odometer 81*e* Information data entry group by performing data entry and/or review of any pre-populated data entry fields. In some embodiments, as shown for example in FIG. 10, the Odometer 81*e* Information data entry group includes: Odometer Miles; Digital Odometer; and Working Odometer.

Item 71-6. Complete the Documents 81f data entry group by performing data entry and/or review of any pre-populated data entry fields. In some embodiments, as shown for example in FIGS. 10 and 11, the Documents 81f data entry group includes: Owner's Manual, Maintenance Book; Warranty Book, EPA Label; and Key Code Card.

Item 71-7. Complete the Keys 81g data entry group by performing data entry and/or review of any pre-populated data entry fields. In some embodiments, as shown for example in FIG. 11, the Keys 81g Information data entry group includes: Number of Keys, Number of Remote Key Fobs, and Keyless Entry.

Item 71-8. Complete the General Vehicle Condition 81h data entry group by performing data entry and/or review of any pre-populated data entry fields. In some embodiments, as shown for example in FIG. 11, the General Vehicle Condition 81h data entry group includes: Engine Starts; Driveable, Interior Odor; and Oil Condition. Data entry may be performed by selection from lists (e.g., Interior Odor list 161 shown in FIG. 16 and Oil Condition list 171 shown in FIG. 17), which are displayed upon selecting the icon adjacent the data entry fields (FIG. 11).

Item 71-9. Complete the Spare Tire 81i data entry group by performing data entry and/or review of any pre-populated data entry fields. In some embodiments, as shown for example in FIG. 11, the Spare Tire 81i data entry group includes: Spare Tire Included; Spare Tire is Mini; Spare Tire Jack and Tools; Spare Tire is Locked; and Tire Lock Key Available.

Item 71-10. Read and acknowledge the phrase "I have completed the General Information section" by selecting the Save icon 115 (FIGS. 11 and 18), which initiates the performance of the save function. Confirm user's choice to perform the save function by selecting Yes or No from the "Save and Complete" confirmation prompt 183 displayed (FIG. 18).

Item 71-11. Upon the successful completion of section requirements validation, data from the General Information section 71 may be stored and/or published to cloud based infrastructure (e.g., cloud based infrastructure 940 shown in FIG. 82). In some embodiments, as shown for example in FIG. 19A, a visual indicator 191 indicative of the section completed (General Information section 71) is displayed adjacent to the section name in the top-level menu.

Item 71-12. Select the next condition report section to be completed from the menu. For example, the Images section 72 may be selected (as indicated by the bold text and bold borders in FIG. 19B).

For ease of explanation, the condition report sections are selected, as described herein, in the order presented in the top-level menu (e.g., shown in FIG. 7A). It is to be understood that the condition report sections may be selected in any order, and the selection of condition report sections may include the return to one or more previously-selected section (s) and/or the selection of condition report sections in an order different than presented in the menu.

Images Section 72

User completion of the Images section 72, in accordance with an embodiment shown in FIGS. 20-27, generally involves the Items 72-1 through 72-22, below. It is to be understood that the layouts and data field options may be varied from the screen 200, 210, 220, 230, 240, 250, 260 and 270 configurations shown in FIGS. 20-27.

Item 72-1. Perform an "Image Capture" procedure for each image required and/or desired for the condition report. In an embodiment, the "Image Capture" procedure includes: a) select the Add Image icon 203 adjacent the data entry field image displayed; b) focus on the selected area of the vehicle within the camera viewfinder using the integrated digital internal or external camera; c) capture the image using the method defined by the camera manufacturer; d) the captured image 218 is displayed on the Add Image pop-up screen 211 (FIG. 21); e) review the image quality of the displayed image 218 and add meta data 216 as allowed by data entry fields and/or lists; f) select the Cancel icon 212 to cancel the image capture process, if desired; otherwise, g) select the Save icon 217 (FIG. 21) to perform the save image function, which stores and/or publishes the image to the cloud based infrastructure (e.g., cloud based infrastructure 940 shown in FIG. 82), external to the user device. Each time that the save icon 217 is depressed, the image data is uploaded and stored to the condition report images database and associated with the particular field in the conditions report documents database. The inspector continues on with the inspection while the uploading of the raw image data is being performed in the background.

Item 72-2. Complete the Exterior Left Front Corner 214a data entry group by capturing an image of the Exterior Left Front Corner of the vehicle (FIG. 21) using the process defined in Item 72-1.

Item 72-3. Complete the Exterior Left Side data entry group by capturing an image of the Exterior Left Side of the vehicle using the process defined in Item 72-1.

Item 72-4. Complete the Exterior Left Rear Corner data entry group by capturing an image of the Exterior Left Rear Corner of the vehicle using the process defined in Item 72-1.

Item 72-5. Complete the Exterior Rear 204a data entry group by capturing an image of the Exterior Rear of the vehicle using the process defined in Item 72-1.

Item 72-6. Complete the Exterior Right Rear Corner 204b data entry group by capturing an image of the Exterior Right Rear Corner of the vehicle using the process defined in Item 72-1.

Item 72-7. Complete the Exterior Right Side 204c data entry group by capturing an image of the Exterior Right Side of the vehicle using the process defined in Item 72-1.

Item 72-8. Complete the Exterior Right Front Corner 204d data entry group by capturing an image of the Exterior Right Front Corner of the vehicle using the process defined in Item 72-1.

Item 72-9. Complete the Exterior Front 204e data entry group by capturing an image of the Exterior Front of the vehicle using the process defined in 72-1.

Item 72-10. Complete the Exterior Left Front Wheel 204f data entry group by capturing an image of the Exterior Left Front Wheel of the vehicle using the process defined in Item 72-1.

Item 72-11. Complete the Exterior Left Door Open data entry group by capturing an image of the Exterior Left Front Door Open of the vehicle using the process defined in Item 72-1.

Item 72-12. Complete the Interior Left Interior data entry group by capturing an image of the Interior Left Front Interior of the vehicle using the process defined in Item 72-1.

Item 72-13. Complete the Interior Odometer data entry group by capturing an image of the Interior Odometer of the vehicle using the process defined in Item 72-1.

Item 72-14. Complete the Exterior Left Rear Door Open data entry group by capturing an image of the Exterior Left Rear Door Open of the vehicle using the process defined in Item 72-1.

Item 72-15. Complete the Exterior Trunk Open data entry group by capturing an image of the Exterior Trunk Open of the vehicle using the process defined in Item 72-1.

Item 72-16. Complete the Exterior Right Rear Door Open data entry group by capturing an image of the Exterior Right Rear Door Open of the vehicle using the process defined in Item 72-1.

Item 72-17. Complete the Exterior Right Front Door Open data entry group by capturing an image of the Exterior Right Front Door Open of the vehicle using the process defined in Item 72-1.

Item 72-18. Complete the Interior Right Front Interior data entry group by capturing an image of the Interior Right Front Interior of the vehicle using the process defined in Item 72-1.

Item 72-19. Complete the Exterior Hood Open data entry group by capturing an image of the Exterior Right Hood Open of the vehicle using the process defined in Item 72-1.

Figure 26:
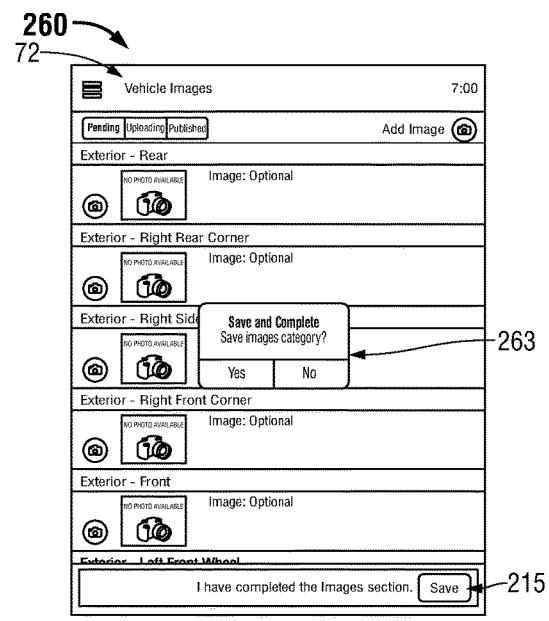
FIG. 26 is a display screen view of vehicle images/save begin confirmation in accordance with an embodiment of the present disclosure.
Figure 27:
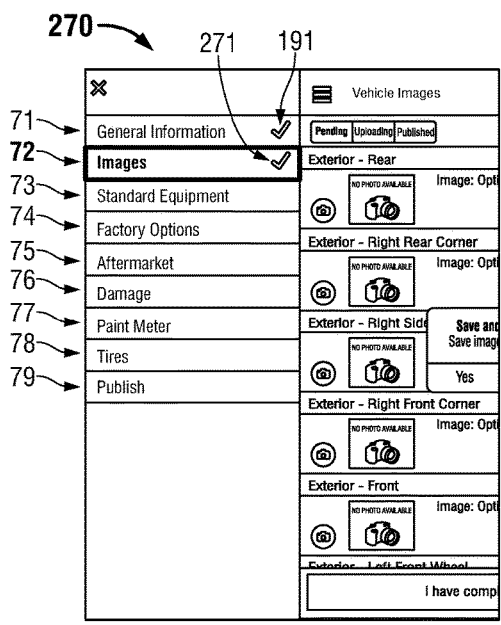
FIG. 27 is a display screen view of vehicle images save completed in accordance with an embodiment of the present disclosure.
Figure 28:
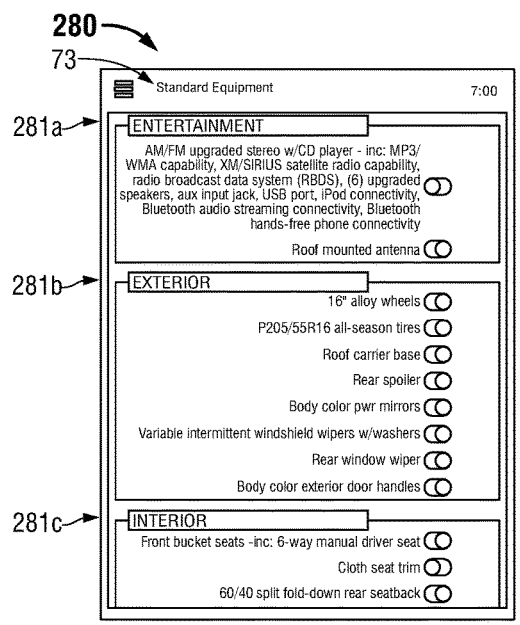
FIG. 28 is a display screen view of standard equipment input in accordance with an embodiment of the present disclosure.
Figure 29:
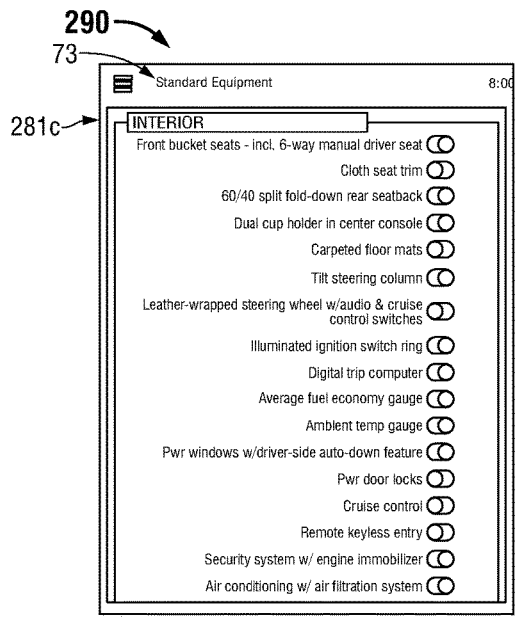
FIG. 29 is a display screen view of standard equipment input in accordance with another embodiment of the present disclosure.
Figure 30:
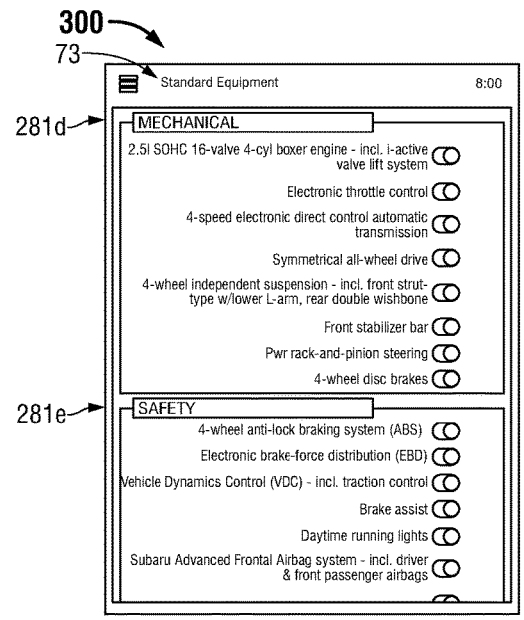
FIG. 30 is a display screen view of standard equipment input in accordance with another embodiment of the present disclosure.
Figure 31:
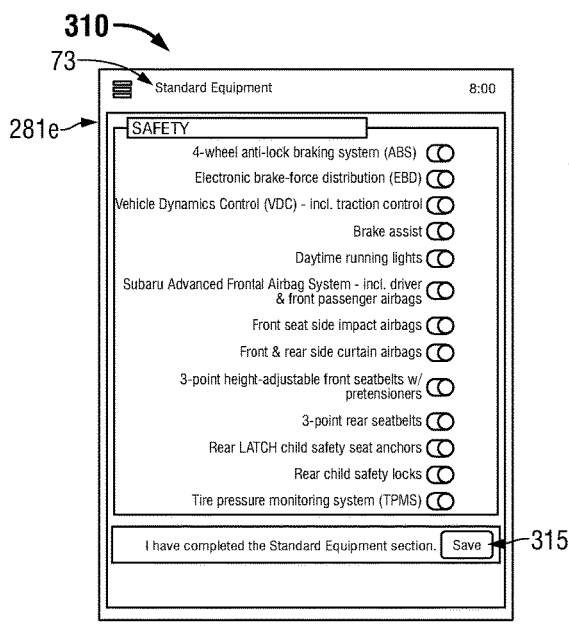
FIG. 31 is a display screen view of standard equipment input in accordance with another embodiment of the present disclosure.

Item 72-20. Read and acknowledge the phrase "I have completed the Images section" by selecting the Save icon 215 (FIGS. 20-24 and 26) to perform the save function. Confirm user's choice to perform the save function by selecting Yes or No from the "Save and Complete" confirmation prompt 263 displayed (FIG. 26).

Item 72-21. Upon successful completion of section requirements validation, data from the Images section 72 is stored and/or published to cloud based infrastructure (e.g., cloud based infrastructure 940 shown in FIG. 82), external to the user device. In some embodiments, as shown for example in FIG. 27, a visual indicator 271 indicative of the section completed (Images section 72) is displayed adjacent to the section name in the top-level menu.

Item 72-22. Select the next condition report section to be completed from the menu.

Standard Equipment Section 73

User completion of the Standard Equipment section 73, in accordance with an embodiment shown in FIGS. 28-33, generally involves the Items 73-1 through 73-9, below. It is to be understood that the screen layouts and data field options may be varied from the screen 280, 290, 300, 310, 320 and 330 configurations shown in FIGS. 28-33.

Item 73-1. Complete the Entertainment standard equipment 281a data entry group by performing data entry and/or review of any pre-populated data entry fields.

Item 73-2. Complete the Exterior standard equipment 281b data entry group by performing data entry and/or review of any pre-populated data entry fields. In some embodiments, as shown for example in FIG. 28, the Exterior standard equipment 281b data entry group includes: 16" alloy wheels; P205/55R16 all-season tires; Roof carrier base; Rear spoiler; Body color power mirrors; Variable intermittent windshield wipers with washers; Rear window wiper; and Body color exterior door handles.

Item 73-3. Complete the Interior standard equipment data 281c entry group by performing data entry and/or review of any pre-populated data entry fields. In some embodiments, as shown for example in FIGS. 28 and 29, the Interior standard equipment 281c data entry group includes: Front bucket seats including 6-way manual driver seat; Cloth seat trim; 60/40 split fold-down rear seatback; Dual cup holder in center console; Carpeted floor mats; Tilt steering column; Leather-wrapped steering wheel with audio and cruise; control switches; Illuminated ignition switch ring; Digital trip computer; Average fuel economy gauge; Ambient temp gauge; Power windows with driver-side auto-down feature; Power door locks; Cruise control; Remote keyless entry; Security system with engine immobilizer; and Air conditioning with air filtration system.

Item 73-4. Complete the Mechanical standard equipment 281d data entry group by performing data entry and/or review of any pre-populated data entry fields. In some embodiments, as shown for example in FIG. 30, Mechanical standard equipment 281d data entry group includes: 2.5 l SOHC 16-valve 4-cyl boxer engine—including active valve lift system; Electronic throttle control 4-speed electronic direct control automatic transmission; Symmetrical all-wheel drive 4-wheel independent suspension—including front strut type with lower L-arm, rear double wishbone; Front stabilizer bar; Power rack-and-pinion steering; and 4-wheel disc brakes.

Item 73-5. Complete the Safety standard equipment 281e data entry group by performing data entry and/or review of any pre-populated data entry fields. In some embodiments, as shown for example in FIGS. 30 and 31, the Interior standard equipment 281c data entry group includes: 4-wheel anti-lock braking system (ABS); Electronic brake-force distribution (EBD); Vehicle Dynamics Control (VDC)—including traction control; Brake assist; Daytime running lights; Subaru Advanced Frontal Airbag System—including driver and front passenger airbags; Front seat side impact airbags; Front and rear side curtain airbags; 3-point height-adjustable front seatbelts with pretensioners; 3-point rear seatbelts; Rear LATCH child safety seat anchors; Rear child safety locks; and Tire pressure monitoring system (TPMS).

Item 73-6. If additional standard equipment data entry groups exist, complete the additional data entry groups by performing data entry and/or review of any pre-populated data entry fields.

Figure 32:
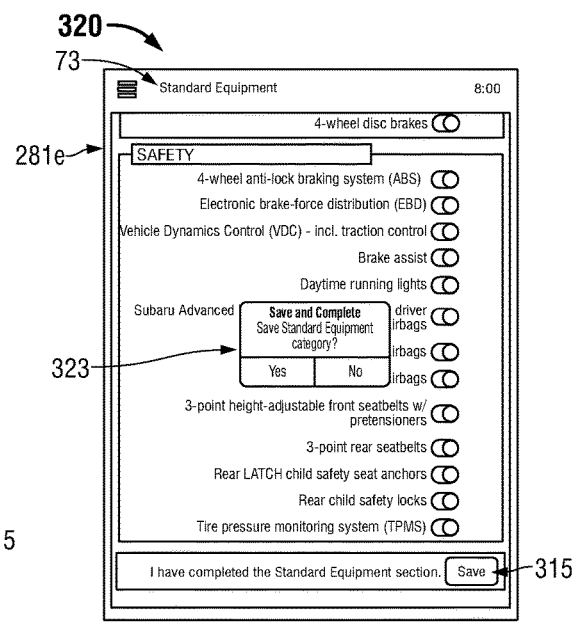
FIG. 32 is a display screen view of standard equipment/save begin confirmation in accordance with an embodiment of the present disclosure.
Figure 33:
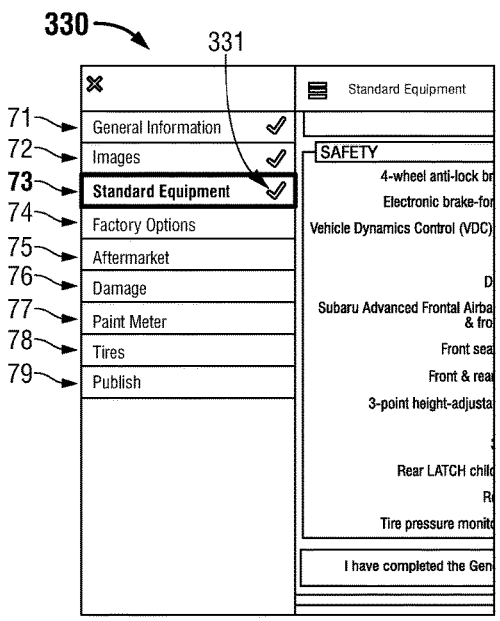
FIG. 33 is a display screen view of standard equipment/save completed in accordance with an embodiment of the present disclosure.
Figure 34:
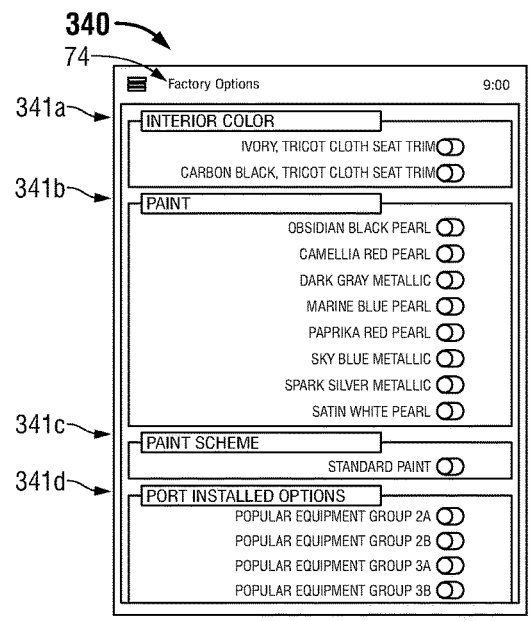
FIG. 34 is a display screen view of factory options input in accordance with an embodiment of the present disclosure.
Figure 35:
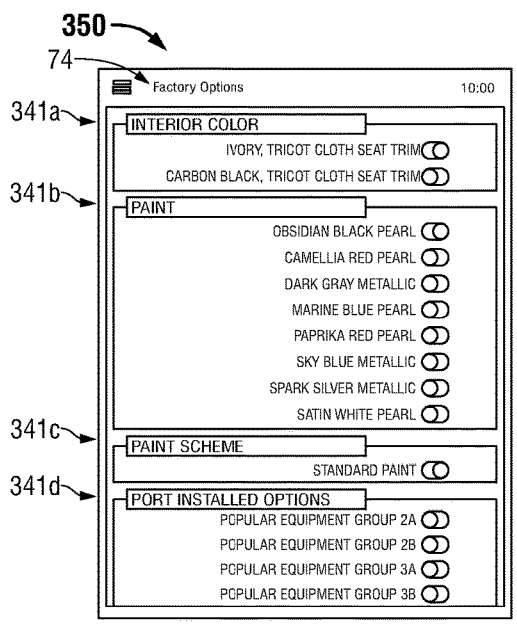
FIG. 35 is a display screen view of factory options input in accordance with another embodiment of the present disclosure.
Figure 36:
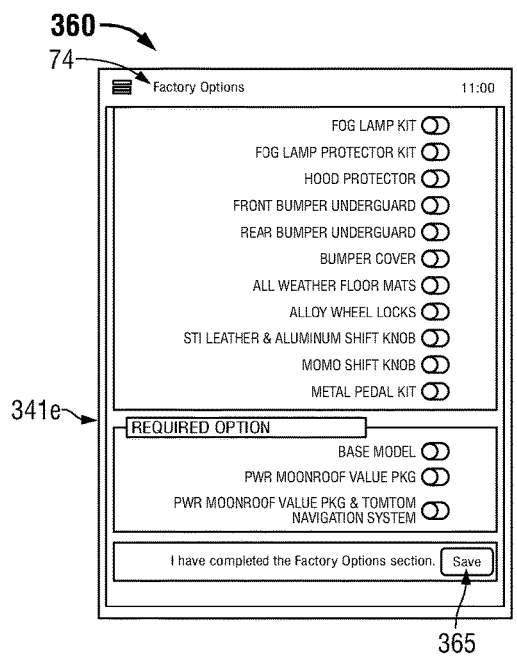
FIG. 36 is a display screen view of factory options input in accordance with another embodiment of the present disclosure.

Item 73-7. Read and acknowledge the phrase "I have completed the Standard Equipment section" by selecting the Save icon 315 (FIGS. 31 and 32) to perform the save function. Confirm user's choice to perform the save function by selecting Yes or No from the "Save and Complete" confirmation prompt 323 displayed (FIG. 32).

Item 73-8. Upon successful completion of section requirements validation, data from the Standard Equipment section 73 is stored and/or published to cloud based infrastructure (e.g., cloud based infrastructure 940 shown in FIG. 82), external to the user device. A visual indicator 331 indicative of the section completed (Standard Equipment section 73) is displayed adjacent to the section name in the top-level menu.

Item 73-9. Select the next condition report section to be completed from the menu.

Factory Options Section 74

User completion of the Factory Options section 74, in accordance with an embodiment shown in FIGS. 34-38, generally involves the Items 74-1 through 74-13, below. It is to be understood that the screen layouts and data field options may be varied from the screen 340, 350, 360, 370 and 380 configurations shown in FIGS. 34-38.

Item 74-1. Complete the Interior Color factory options 341a data entry group, if present, by performing data entry and/or review of any pre-populated data entry fields.

Item 74-2. Complete the Paint factory options 341b and 341c data entry groups if, present, by performing data entry and/or review of any pre-populated data entry fields.

Item 74-3. Complete the Option Package factory options data entry group if, present, by performing data entry and/or review of any pre-populated data entry fields.

Item 74-4. Complete the Option Group factory options 341d data entry group, if present, by performing data entry and/or review of any pre-populated data entry fields.

Item 74-5. Complete the Exterior factory options data entry group, if present, by performing data entry and/or review of any pre-populated data entry fields.

Item 74-6. Complete the Interior factory options data entry group, if present, by performing data entry and/or review of any pre-populated data entry fields.

Item 74-7. Complete the Mechanical factory options data entry group, if present, by performing data entry and/or review of any pre-populated data entry fields.

Item 74-8. Complete the Entertainment factory options data entry group, if present, by performing data entry and/or review of any pre-populated data entry fields.

Item 74-9. Complete the Safety factory options data entry group, if present, by performing data entry and/or review of any pre-populated data entry fields.

Item 74-10. If additional factory options data entry groups exists (e.g., Port Installed Options 341d shown in FIG. 35 and Required Option 341e shown in FIG. 36) complete the additional data entry groups by performing data entry and/or review of any pre-populated data entry fields.

Figure 37:
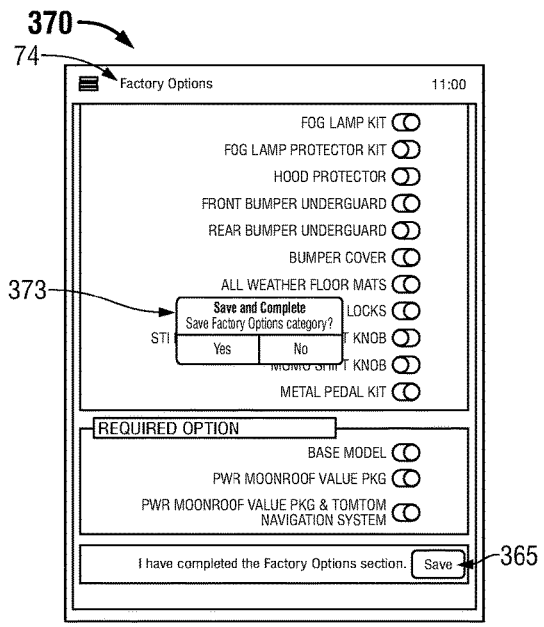
FIG. 37 is a display screen view of factory options/input save begin confirmation in accordance with an embodiment of the present disclosure.
Figure 38:
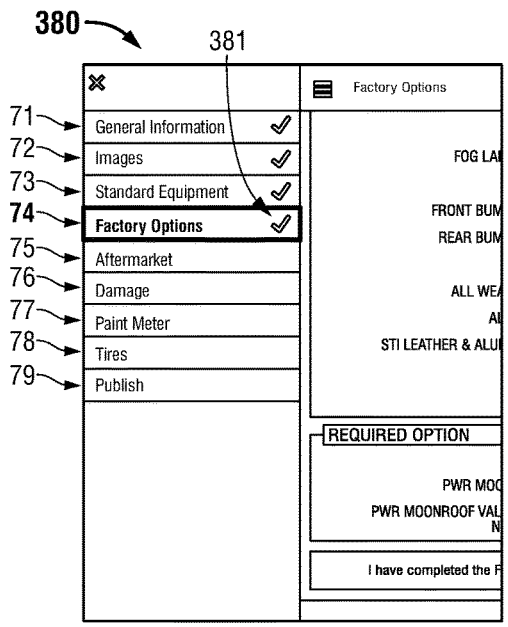
FIG. 38 factory options/input save completed in accordance with an embodiment of the present disclosure.
Figure 39:
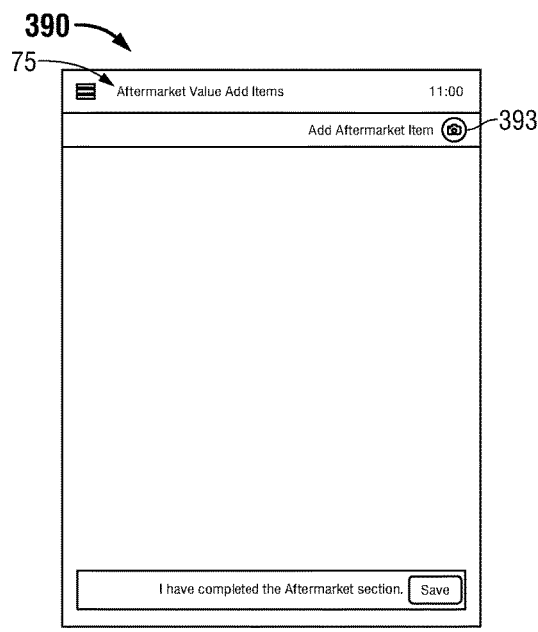
FIG. 39 is a display screen view of aftermarket input in accordance with an embodiment of the present disclosure.
Figure 40:
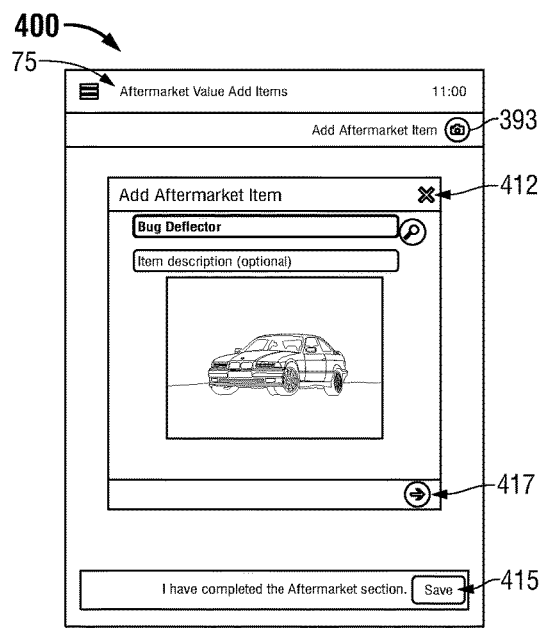
FIG. 40 is a display screen view of aftermarket input/add image in accordance with an embodiment of the present disclosure.
Figure 41:
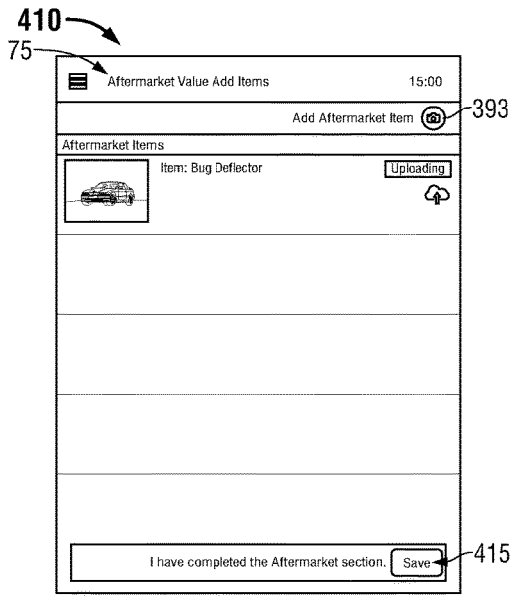
FIG. 41 is a display screen view of aftermarket input/image uploading in accordance with an embodiment of the present disclosure.
Figure 42:
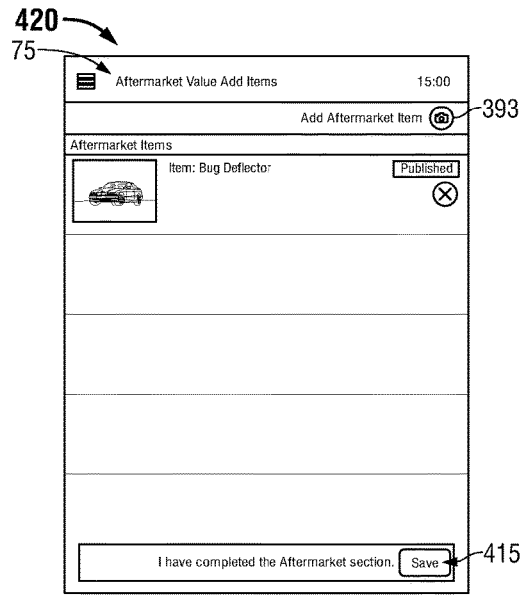
FIG. 42 is a display screen view of aftermarket input/image published in accordance with an embodiment of the present disclosure.
Figure 43:
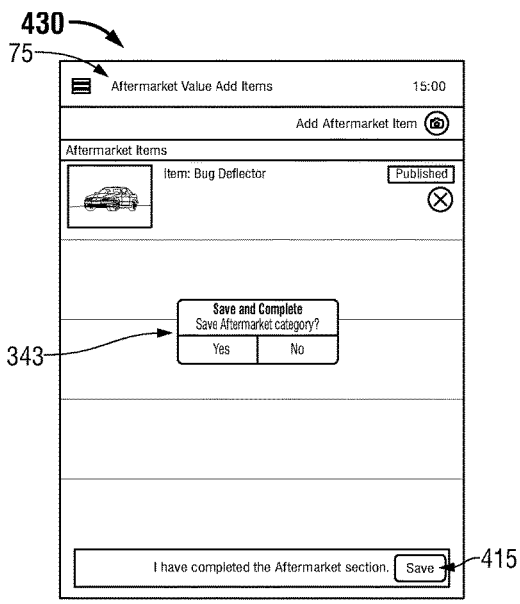
FIG. 43 is a display screen view of aftermarket input/save begin confirmation in accordance with an embodiment of the present disclosure.
Figure 44:
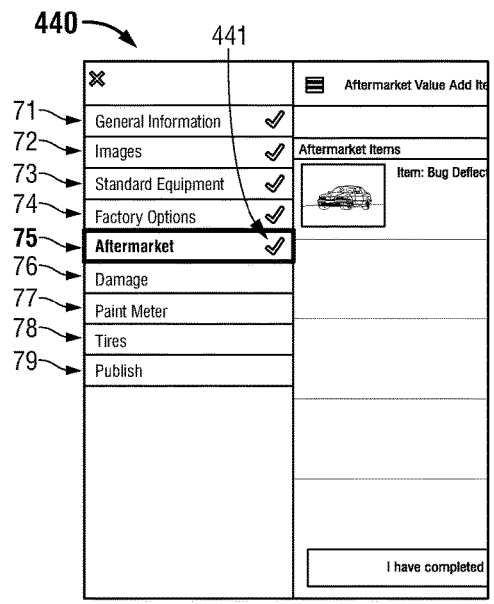
FIG. 44 is a display screen view of aftermarket input/save completed in accordance with an embodiment of the present disclosure.
Figure 45:
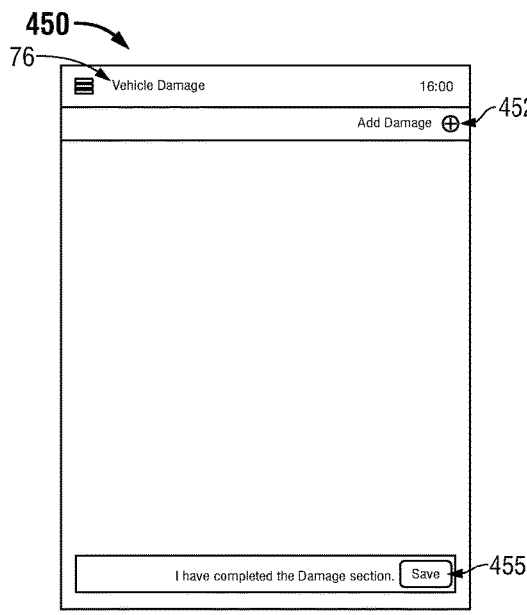
FIG. 45 is a display screen view of vehicle damage input in accordance with an embodiment of the present disclosure.
Figure 46:
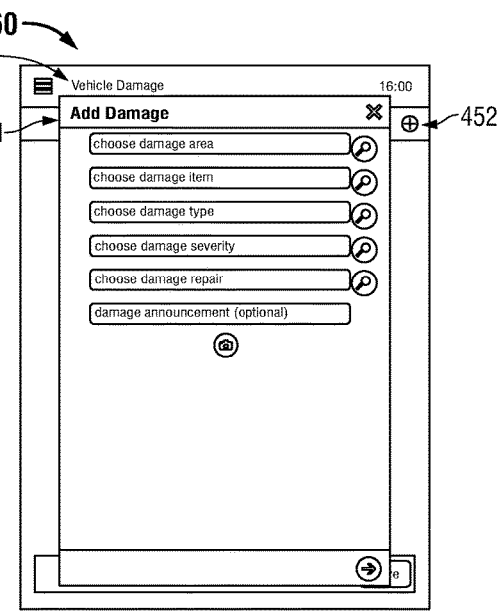
FIG. 46 is a display screen view of vehicle damage input/add damage in accordance with an embodiment of the present disclosure.
Figure 47:
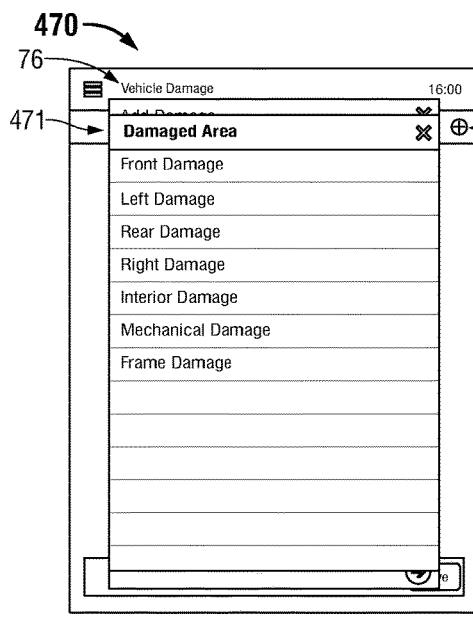
FIG. 47 is a display screen view of vehicle damage input/add damaged area list in accordance with an embodiment of the present disclosure.
Figure 48:
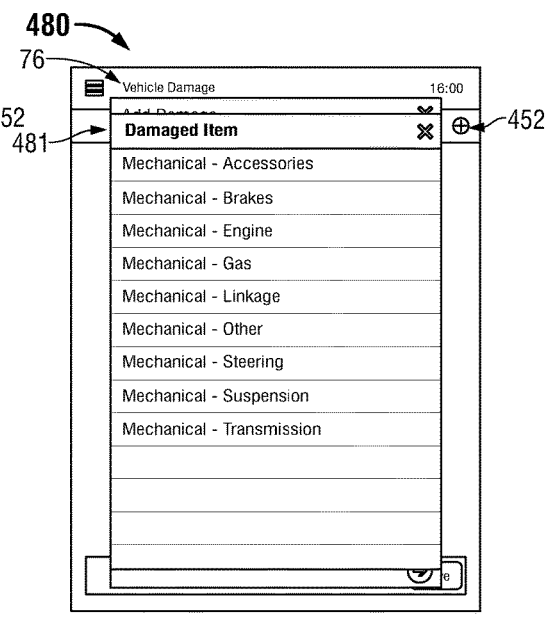
FIG. 48 is a display screen view of vehicle damage input/add damaged item list in accordance with another embodiment of the present disclosure.
Figure 49:
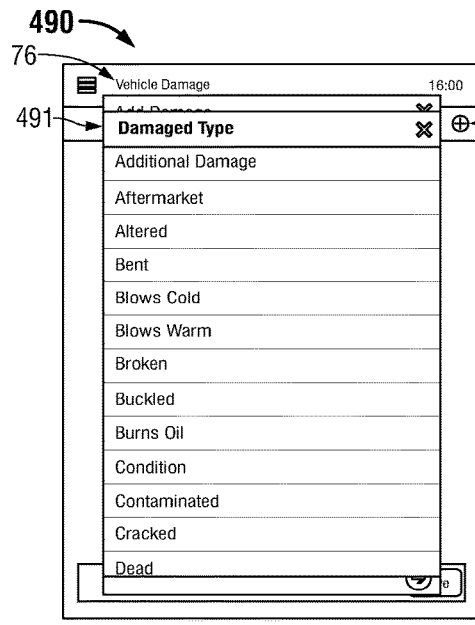
FIG. 49 is a display screen view of vehicle damage input/add damage type list in accordance with another embodiment of the present disclosure.
Figure 50:
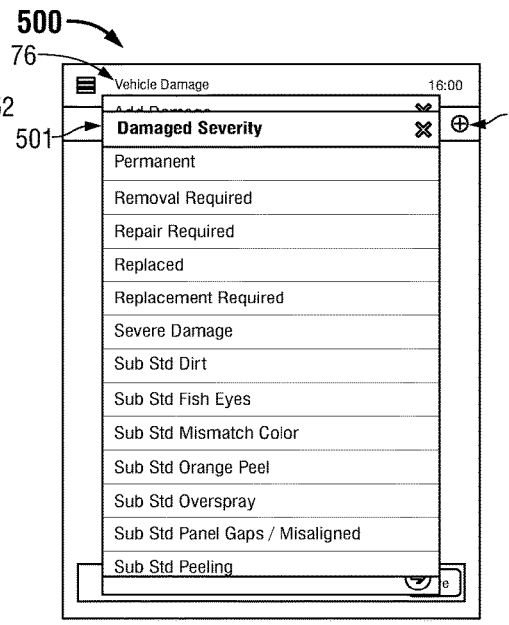
FIG. 50 is a display screen view of vehicle damage input/add damage severity list in accordance with another embodiment of the present disclosure.
Figure 51:
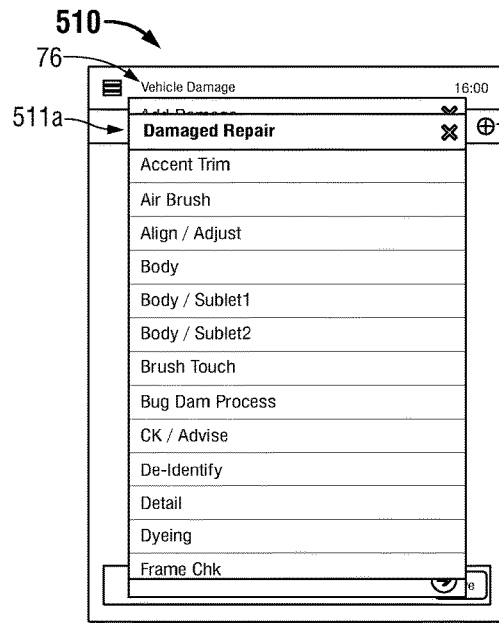
FIG. 51 is a display screen view of vehicle damage input/add damage repair list in accordance with another embodiment of the present disclosure.
Figure 52:
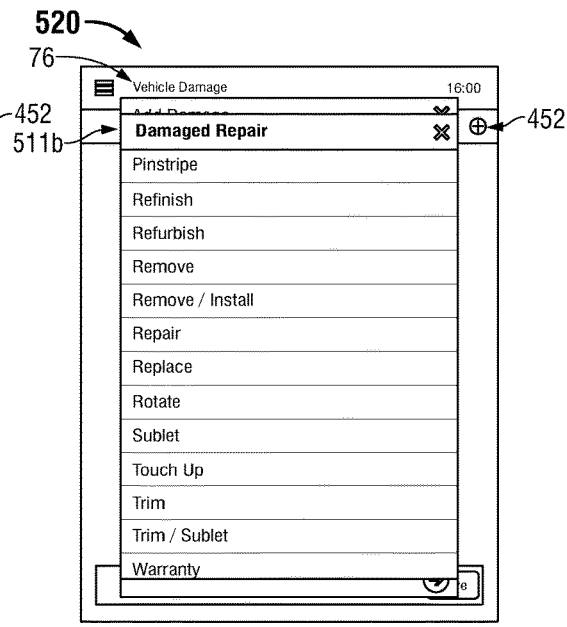
FIG. 52 is a display screen view of vehicle damage input/add damage repair list in accordance with another embodiment of the present disclosure.
Figures 53, 54:
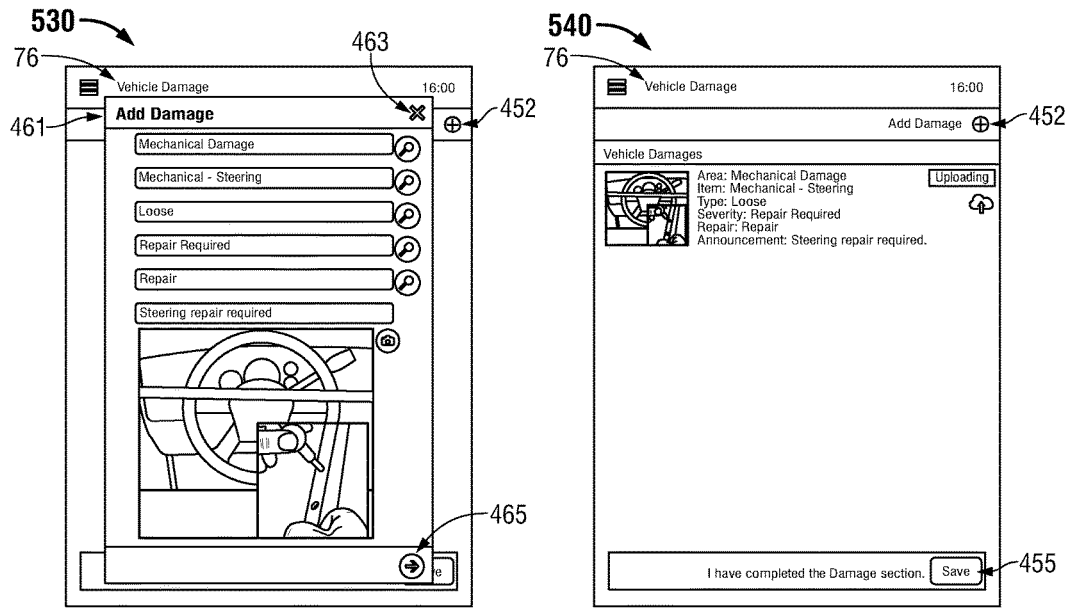
FIG. 53 is a display screen view of vehicle damage input/add damage image in accordance with an embodiment of the present disclosure.
FIG. 54 is a display screen view of vehicle damage input/image uploading in accordance with an embodiment of the present disclosure.

Item 74-11. Read and acknowledge the phrase "I have completed the Factory Options section" by selecting the Save icon 365 (FIGS. 36 and 37) to perform the save function. Confirm user's choice to perform the save function by selecting Yes or No from the "Save and Complete" confirmation prompt 373 displayed (FIG. 37).

Item 74-12. Upon successful completion of section requirements validation, data from the Factory Options section 74 is stored and/or published to cloud based infrastructure (e.g., cloud based infrastructure 940 shown in FIG. 82), external to the user device. A visual indicator 381 (FIG. 38) of the section being completed is displayed adjacent to the section name in the menu.

Item 74-13. Select the next condition report section to be completed from the menu.

Aftermarket Section 75

User completion of the Aftermarket section 75, in accordance with an embodiment shown in FIGS. 39-44, generally involves the Items 75-1 through 75-5, below. It is to be understood that the screen layouts and data field options may be varied from the screen 390, 400, 410, 420, 430 and 440 configurations shown in FIGS. 39-44.

Item 75-1. Capture data for each aftermarket equipment and feature installed on the vehicle. In an embodiment, this procedure includes: a) select the Add Aftermarket Item icon 393 (FIG. 39); b) focus on the aftermarket equipment or features within the camera viewfinder using the integrated digital internal or external camera; c) capture the image using the method defined by the camera manufacturer; d) the captured image will be displayed by the Add Aftermarket Item screen (FIG. 40); e) populate the Aftermarket Item data entry field by performing data entry and/or review of any pre-populated data—data entry may be performed by selection from a list (not shown), which is displayed upon selecting the icon adjacent data entry field; f) Populate the Aftermarket Item Description data entry field by performing data entry and/or review of any pre-populated data; g) review the image quality and add metadata as allowed by data entry fields and/or lists; h) select the Cancel icon 412 to cancel the Add Aftermarket and image capture process if desired; otherwise i) select the Save icon 417 to perform the save Aftermarket Item function, which stores and/or publishes the aftermarket item data entry and aftermarket item image to the cloud based infrastructure (e.g., cloud based infrastructure 940 shown in FIG. 82), external to the user device. The list in step e) above may include but is not limited to bed liner, chrome wheels and navigation. Once again each time that the save icon 417 is depressed, the image data is uploaded and stored to the conditions report images database and associated with the particular field in the conditions report documents database. The inspector continues on with the inspection while the uploading of the raw image data is being performed in the background.

Item 75-2. Complete the Add Aftermarket Item procedure for each Aftermarket equipment and/or feature identified on the vehicle the using the process defined in Item 75-1.

Item 75-3. Read and acknowledge the phrase "I have completed the Aftermarket section" by selecting the Save icon 415 (FIGS. 40-43) to perform the save function. Confirm user's choice to perform the save function by selecting Yes or No from the "Save and Complete" confirmation prompt displayed.

Item 75-4. Upon successful completion of section requirements validation, data from the Aftermarket section 75 is stored and/or published to cloud based infrastructure (e.g., cloud based infrastructure 940 shown in FIG. 82), external to the user device. A visual indicator 441 (FIG. 44) of the section completed (Aftermarket section 75) is displayed adjacent to the section name in the menu.

Item 75-5. Select the next condition report section to be completed from the menu.

Damages Section 76

User completion of the Damages section 76, in accordance with an embodiment shown in FIGS. 45-56, generally involves the Items 76-1 through 76-5, below. It is to be understood that the screen layouts and data field options may be varied from the screen 450, 460, 470, 480, 490, 500, 510, 520, 530, 540, 550 and 560 configurations shown in FIGS. 45-56.

Item 76-1. Capture data for each Damage identified on the vehicle. In an embodiment, the procedure includes: a) select the Add Damage Item icon 452 (FIG. 45); b) focus the damaged item or area of vehicle for which you are capturing an image within the camera viewfinder using the integrated digital internal or external camera; c) capture the image using the method defined by the camera manufacturer—the image captured will be displayed by the Add Damage screen 461 (FIG. 53); d) populate the Damage Area data entry field by performing data entry and/or review of any pre-populated data—data entry may be performed by selection from a list (FIG. 47), which is displayed upon selecting the icon adjacent to the data entry field; e) populate the Damaged Item data entry field by performing data entry and/or review of any pre-populated data; f) data entry may be performed by selection from a list (FIG. 48), displayed upon selecting the icon adjacent to the data entry field; g) populate the Damage Type data entry field by performing data entry and/or review of any pre-populated data—data entry may be performed by selection from a list (FIG. 49), displayed upon selecting the icon adjacent to the data entry field; h) populate the Damage Severity data entry field by performing data entry and/or review of any pre-populated data—data entry may be performed by selection from a list (FIG. 50), which is displayed upon selecting the icon adjacent to the data entry field; i) populate the Damage Repair data entry field by performing data entry and/or review of any pre-populated data—data entry may be performed by selection from a list (FIG. 52), which is displayed upon selecting the icon adjacent to the data entry field; review the image quality and data entry performed in the previous steps for accuracy and verification; j) select the Cancel icon 463 to cancel the Add Damage and image capture process if desired; otherwise, k) select the Save icon 465 to perform the save Damage function which stores and/or published the damage data entry and damage image to the cloud based infrastructure (e.g., cloud based infrastructure 940 shown in FIG. 82), external to the user device. Each time that the save icon 465 is depressed, the image data is uploaded and stored to the conditions report images database and associated with a particular field in the conditions report documents database. The inspector continues with the inspection while the uploading of the raw images is performed in the background.

Item 76-2. Complete the Add Damage procedure for each Damaged item, system or process identified on the vehicle, using the process defined in 76-1.

Figures 55, 56:
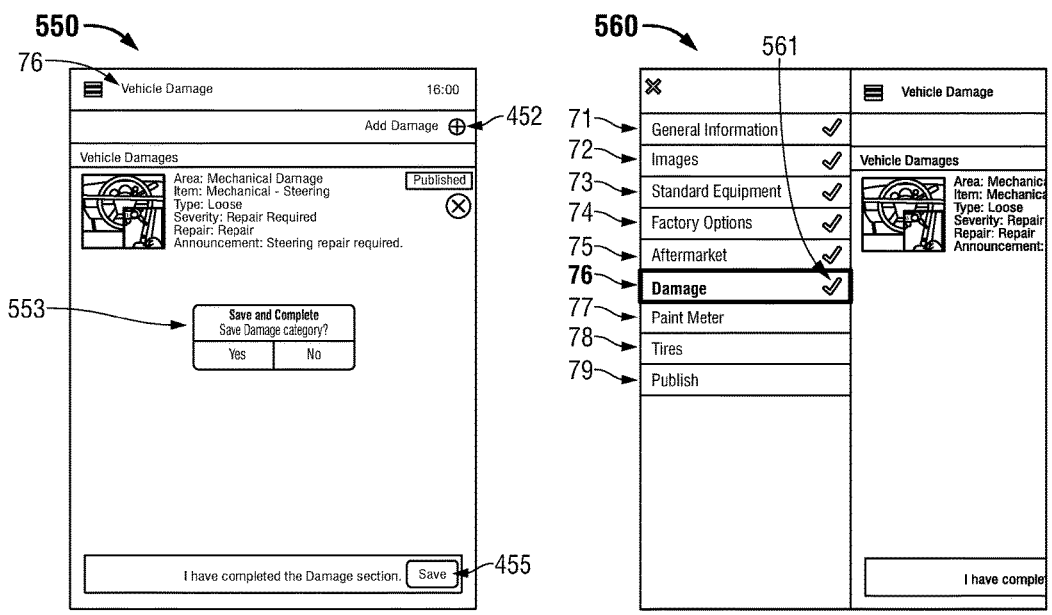
FIG. 55 is a display screen view of vehicle damage input/save begin confirmation in accordance with an embodiment of the present disclosure.
FIG. 56 is a display screen view of vehicle damage input/save completed in accordance with an embodiment of the present disclosure.
Figure 73:
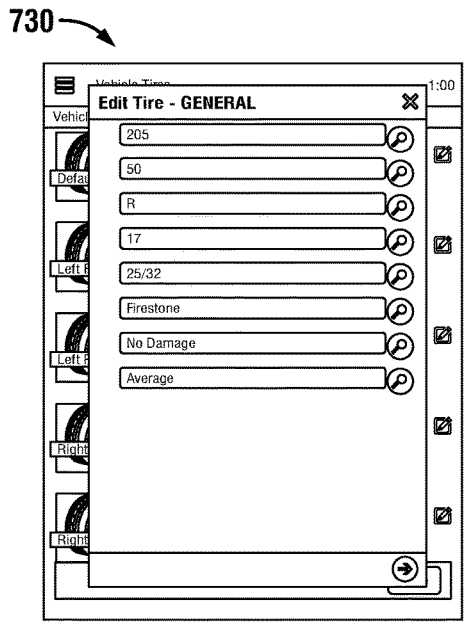
FIG. 73 is a display screen view of vehicle tires input/edit tire record list in accordance with another embodiment of the present disclosure.
Figure 74:
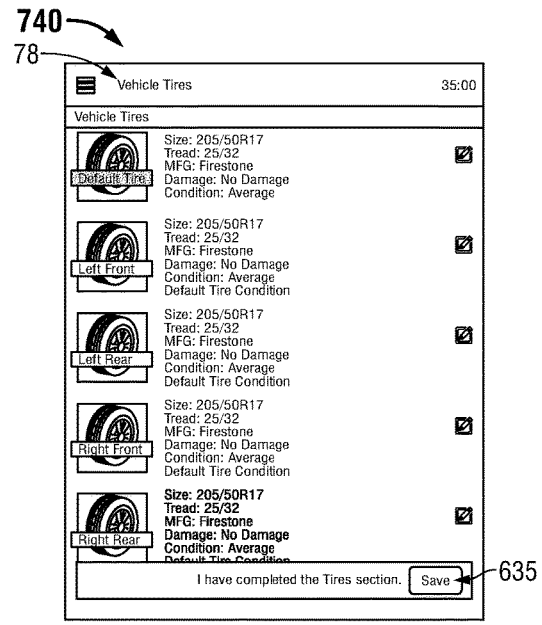
FIG. 74 is a display screen view of vehicle tires input/edit tire record end in accordance with an embodiment of the present disclosure.
Figure 75:
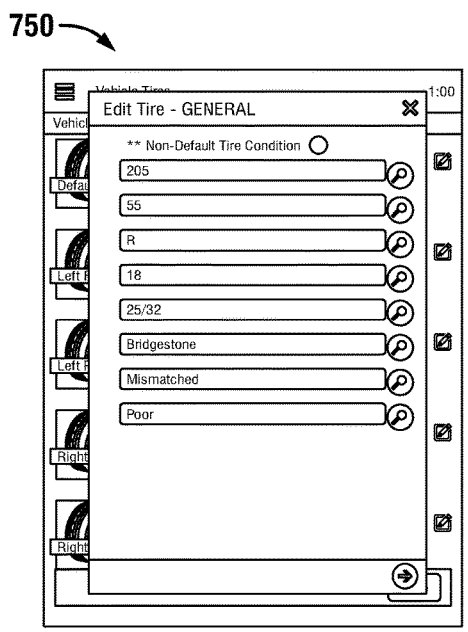
FIG. 75 is a display screen view of vehicle tires input/edit tire record non-default values in accordance with an embodiment of the present disclosure.

Item 76-3. Read and acknowledge the phrase "I have completed the Damage section" by selecting the Save icon 455 (FIGS. 45, 54 and 55) to perform the save function. Confirm user's choice to perform the save function by selecting Yes or No from the "Save and Complete" confirmation prompt 553 displayed (FIG. 55).

Item 76-4. Upon successful completion of section requirements validation, data from the Damages section 76 is stored and/or published to cloud based infrastructure (e.g., cloud based infrastructure 940 shown in FIG. 82), external to the user device. A visual indicator 561 (FIG. 56) of the section completed (Damages section 76) is displayed adjacent to the section name in the menu.

Item 76-5. Select the next condition report section to be completed from the menu.

Paint Meter Section 77

User completion of the Paint Meter section 77, in accordance with an embodiment shown in FIGS. 57-62, generally involves the Items 77-1 through 77-16, below. It is to be understood that the screen layouts and data field options may be varied from the screen 570, 580, 590, 600, 610 and 620 configurations shown in FIGS. 57-62.

Item 77-1. If using an integrated wireless coating thickness gauge perform the following functions: a) connect the wireless coating thickness gauge (e.g., via Bluetooth) to the user device using the method defined by the device manufacturer; b) select the wireless paint meter image icon to establish a connection to the integrated wireless coating thickness gauge (FIG. 57); c) select the specific wireless coating thickness gauge desired from the list of available wireless coating thickness gauges connected to the device (FIG. 57), which is performing the condition reporting process; and d) verify the "paint meter connection open" message is displayed (FIG. 58) and the paint meter image meter reading displays "0.0" (FIG. 58), within the Paint Meter section display.

Item 77-2. Populate the Left Front Bumper, also known as Left Front Quarter Panel, data entry fields by first selecting the data entry field then capturing a coating thickness gauge meter reading using a connected device or by performing data entry.

Item 77-3. Populate the Left Front Driver Door data entry fields by first selecting the data entry field then capturing a coating thickness gauge meter reading using a connected device or by performing data entry.

Item 77-4. Populate the Left Rear Passenger Door data entry fields by first selecting the data entry field then capturing a coating thickness gauge meter reading using a connected device or by performing data entry.

Item 77-5. Populate the Left Rear Quarter Panel data entry fields by first selecting the data entry field then capturing a coating thickness gauge meter reading using a connected device or by performing data entry.

Item 77-6. Populate the Rear Trunk data entry fields by first selecting the data entry field then capturing a coating thickness gauge meter reading using a connected device or by performing data entry.

Item 77-7. Populate the Right Rear Quarter Panel data entry fields by first selecting the data entry field then capturing a coating thickness gauge meter reading using a connected device or by performing data entry.

Item 77-8. Populate the Right Rear Passenger Door data entry fields by first selecting the data entry field then capturing a coating thickness gauge meter reading using a connected device or by performing data entry.

Item 77-9. Populate the Right Front Passenger Door data entry fields by first selecting the data entry field then capturing a coating thickness gauge meter reading using a connected device or by performing data entry.

Item 77-10. Populate the Right Front Bumper, also known as Right Front Quarter Panel, data entry fields by first selecting the data entry field then capturing a coating thickness gauge meter reading using a connected device or by performing data entry.

Item 77-11. Populate the Front Hood data entry fields by first selecting the data entry field then capturing a coating thickness gauge meter reading using a connected device or by performing data entry.

Item 77-12. Populate the Roof Top data entry fields by first selecting the data entry field then capturing a coating thickness gauge meter reading using a connected device or by performing data entry.

Item 77-13. Populate data entry fields for any additional area of the vehicle if present by first selecting the data entry field then capturing a coating thickness gauge meter reading using a connected device or by performing data entry.

Figures 61, 62, 63, 64:
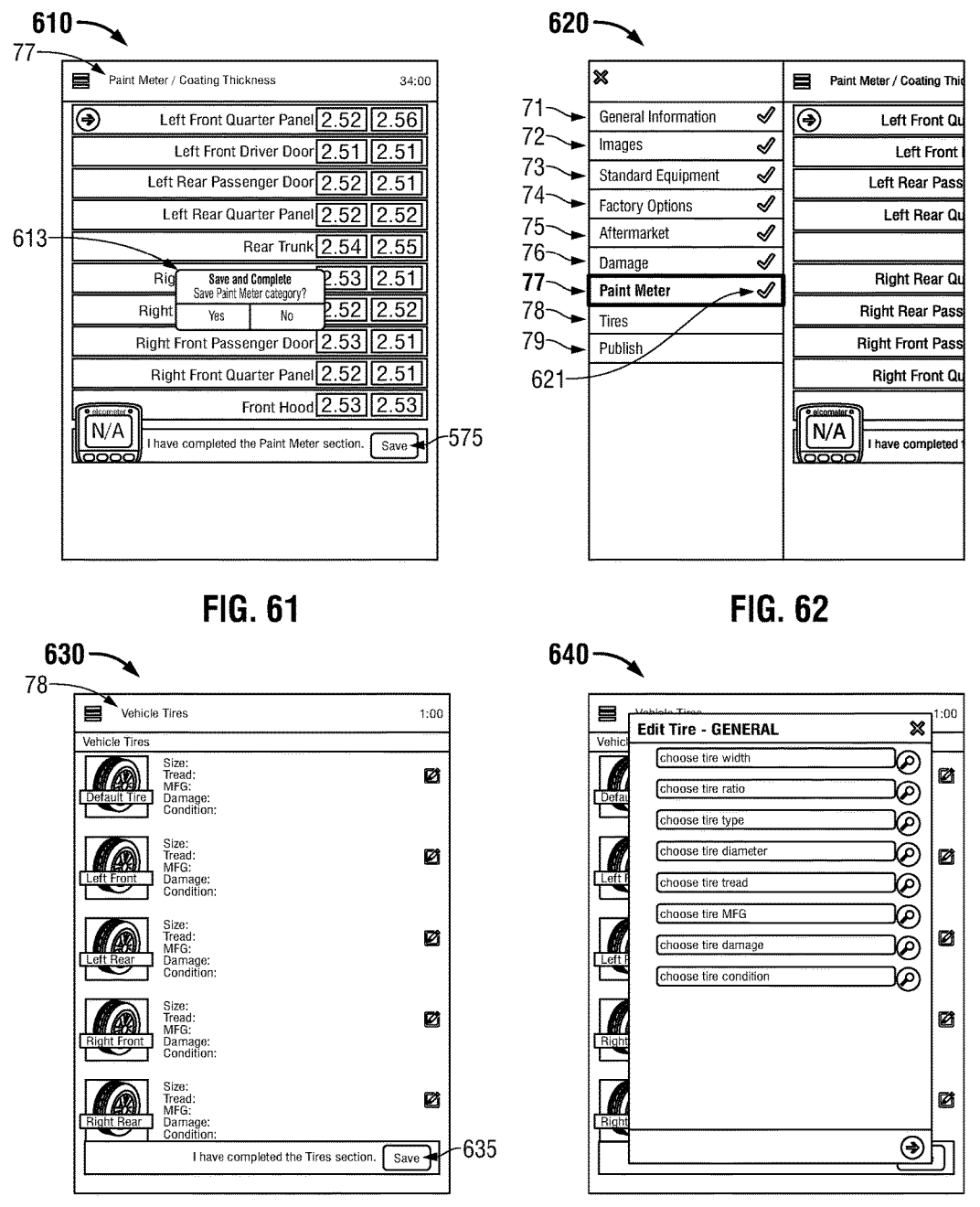

Item 77-14. Read and acknowledge the phrase "I have completed the Paint Meter section" by selecting the Save icon 575 (FIGS. 57-61) to perform the save function. Confirm user's choice to perform the save function by selecting Yes or No from the "Save and Complete" confirmation prompt 613 displayed (FIG. 61).

Item 77-15. Upon successful completion of section requirements validation, data from the Paint Meter section 77 is stored and/or published to cloud based infrastructure (e.g., cloud based infrastructure 940 shown in FIG. 82), external to the user device. A visual indicator 621 (FIG. 62) of the section completed (Paint Meter section 77) is displayed adjacent to the section name in the menu.

Item 77-16. Select the next condition report section to be completed from the menu.

Tire Section 78

User completion of the Tire section 78, in accordance with an embodiment shown in FIGS. 63-78, generally involves the Items 78-1 through 78-10, below. It is to be understood that the screen layouts and data field options may be varied from the screen 630, 640, 650, 660, 670, 680, 690, 700, 710, 720, 730, 740, 750, 760, 770 and 780 configurations shown in FIGS. 63-78.

Item 78-1. Perform a "Tire Data Capture" procedure for each tire displayed within the Tire section of the condition report process. In an embodiment, the "Tire Data Capture" procedure includes: a) select the edit tire icon adjacent to the tire image and description displayed; b) the Edit Tire screen 640 (FIG. 64) will be displayed with data entry fields used to collect information regarding the tire selected; c) populate the Tire Width data entry field or review any pre-populated data entry—data entry may be performed by selection from a list (FIG. 65), which is displayed upon selecting the icon adjacent the choose tire width data entry field; d) populate the Tire Ratio data entry field or review any pre-populated data entry—data entry may be performed by selection from a list (FIG. 66), which is displayed upon selecting the icon adjacent to the data entry fields; e) populate the Tire Type data entry field or review any pre-populated data entry—data entry may be performed by selection from a list (FIG.

67), which is displayed upon selecting the icon adjacent to the data entry fields; f) populate the Tire Diameter data entry field or review any pre-populated data entry—data entry may be performed by selection from a list (FIG. 68), which is displayed upon selecting the icon adjacent to the data entry fields; g) populate the Tire Tread data entry field or review any pre-populated data entry—data entry may be performed by selection from a list (FIG. 69), which is displayed upon selecting the icon adjacent to the data entry fields; h) populate the Tire Manufacturer (MFG) data entry field or review any pre-populated data entry—data entry may be performed by selection from a list (FIG. 70), which is displayed upon selecting the icon adjacent to the data entry fields; i) populate the Tire Damage data entry field or review any pre-populated data entry—data entry may be performed by selection from a list (FIG. 71), which is displayed upon selecting the icon adjacent to the data entry fields; j) populate the Tire Condition data entry field or review any pre-populated data entry—data entry may be performed by selection from a list (FIG. 72), which is displayed upon selecting the icon adjacent to the data entry fields; k) review and verify the completed Edit Tire data entry (FIG. 73) for accuracy; l) select the Cancel icon to cancel the Edit Tire data capture process if desired; otherwise, m) select the Save icon to perform the save tire data function, which stores and/or published the image to the cloud based infrastructure (e.g., cloud based infrastructure 940 shown in FIG. 82), external to the user device.

Item 78-2. Complete the "Tire Data Capture" procedure for the Default Tire, also referred to as General tire, data entry group using the process defined in 78-1.

Figure 76:
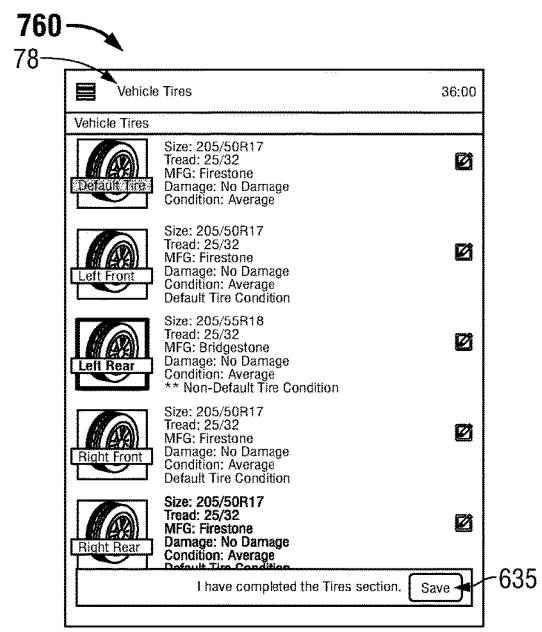
FIG. 76 is a display screen view of vehicle tires input/ non-default value display in accordance with an embodiment of the present disclosure.

Item 78-3. Verify data collected during the tire data capture procedure for the default tire has been applied to all other tires displayed within the Tire section of the condition report process (FIG. 76).

Item 78-4. Complete the "Tire Data Capture" procedure for the Left Front Tire data entry group using the process defined in 78-1. Modify the "Non-Default Tire Condition" user input value to reflect a false value if the tire does not adhere to the same data and conditions collected for the Default Tire.

Item 78-5. Complete the "Tire Data Capture" procedure for the Left Rear Tire data entry group using the process defined in 78-1. Modify the "Non-Default Tire Condition" user input value to reflect a false value if the tire does not adhere to the same data and conditions collected for the Default Tire.

Item 78-6. Complete the "Tire Data Capture" procedure for the Right Rear Tire data entry group using the process defined in 78-1. Modify the "Non-Default Tire Condition" user input value to reflect a false value if the tire does not adhere to the same data and conditions collected for the Default Tire.

Item 78-7. Complete the "Tire Data Capture" procedure for the Right Front Tire data entry group using the process defined in 78-1. Modify the "Non-Default Tire Condition" user input value to reflect a false value if the tire does not adhere to the same data and conditions collected for the Default Tire.

Figures 77, 78:
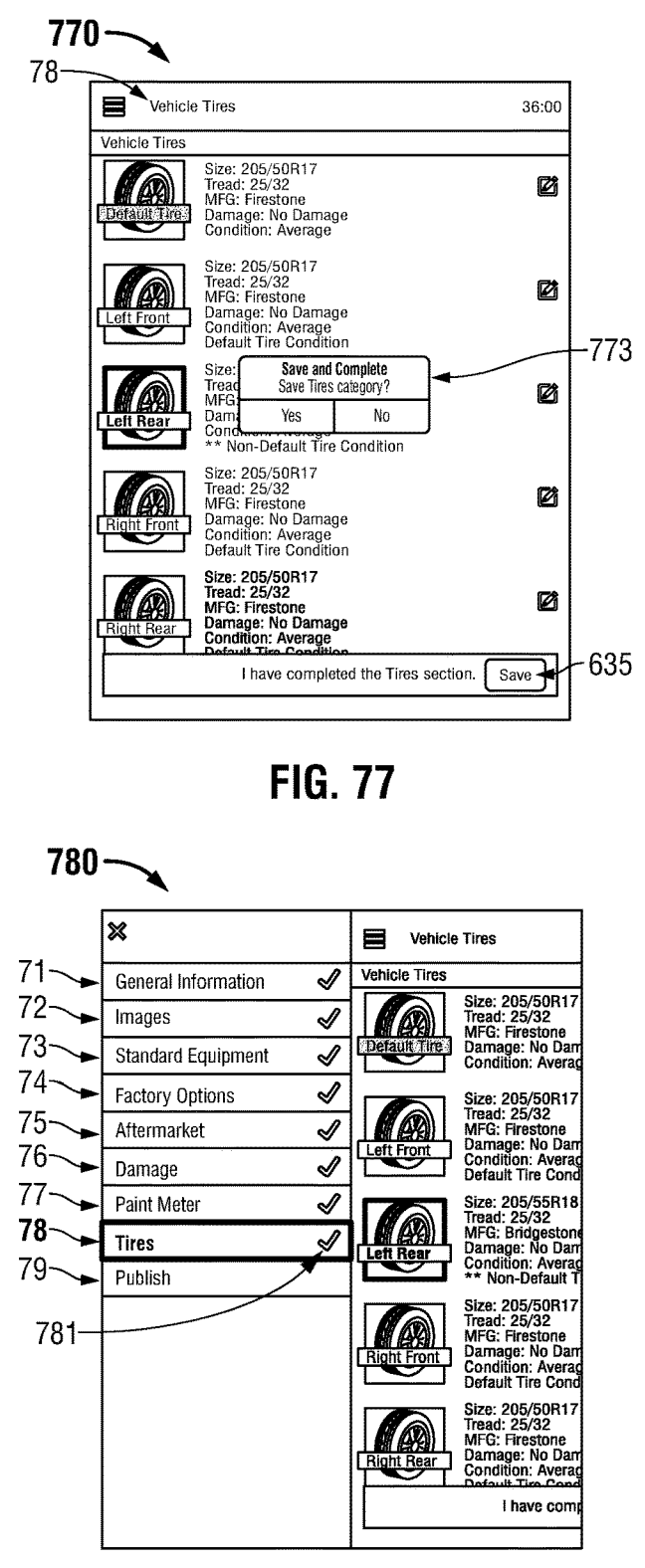

Item 78-8. Read and acknowledge the phrase "I have completed the Tires section" by selecting the Save icon 635 (FIGS. 63, 74, 76 and 77) to perform the save function. Confirm user's choice to perform the save function by selecting Yes or No from the "Save and Complete" confirmation prompt 773 displayed (FIG. 77).

Item 78-9. Upon successful completion of section requirements validation, data from the Tire section 78 is stored and/or published to cloud based infrastructure (e.g., cloud based infrastructure 940 shown in FIG. 82), external to the user device. A visual indicator 781 (FIG. 78) of the section completed (Tire section 78) is displayed adjacent to the section name in the menu.

Item 78-10. Select the next condition report section to be completed from the menu.

Publish Section 79

Figure 79:
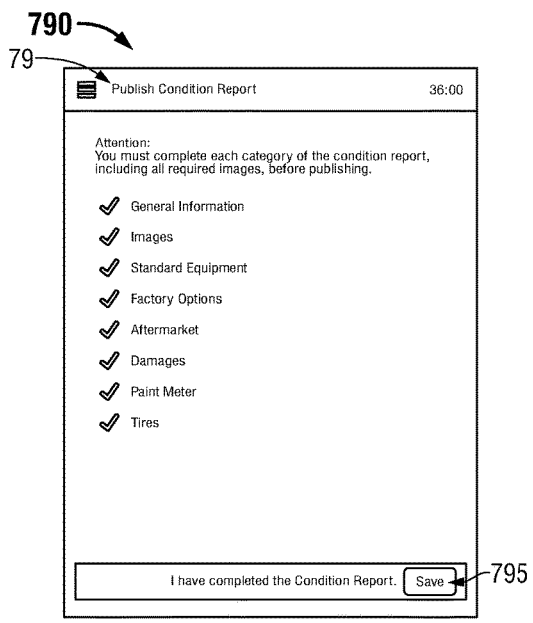
FIG. 79 is a display screen view of publish condition report/begin verify requirements in accordance with an embodiment of the present disclosure.
Figure 80:
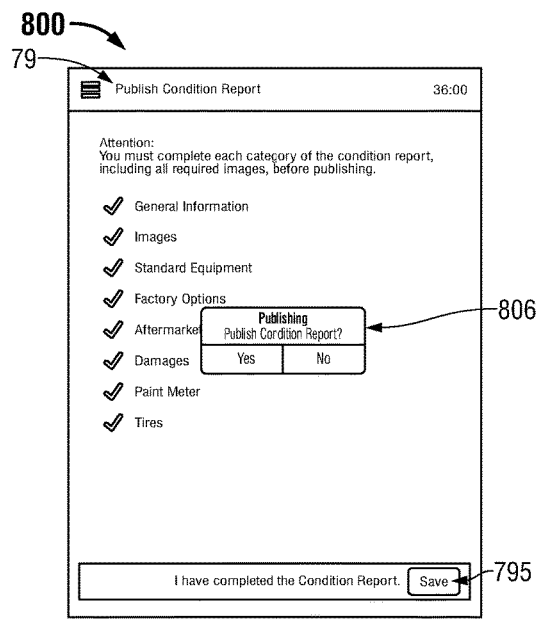
FIG. 80 is a display screen view of publish condition report/begin publish confirmation in accordance with an embodiment of the present disclosure.
Figure 81:
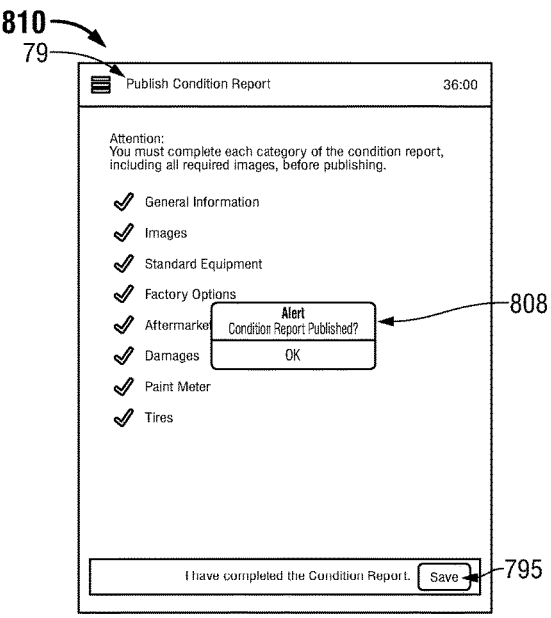
FIG. 81 is a display screen view of publish condition report/end publish completed in accordance with an embodiment of the present disclosure.

User completion of the Publish section 79, in accordance with an embodiment shown in FIGS. 79-81, generally involves the Items 79-1 through 79-6, below. It is to be understood that the screen layouts and data field options may be varied from the screen 790, 800 and 810 configurations shown in FIGS. 79-81.

Item 79-1. Review the visual indicators adjacent each section name displayed in the display area.

Item 79-2. Determine if any sections have not been previously completed which is indicated by a red icon and/or text declaring the section as "incomplete," which shall appear adjacent the section name. If any named section is incomplete, return to the corresponding section of the condition reporting process in order to complete the section using methods defined for the section.

Item 79-3. Read and acknowledge the phrase "I have completed the Condition Report" by selecting the Save icon 795 (FIGS. 79-81) to perform the publish condition report function. Confirm user's choice to perform the publish function by selecting Yes or No from the "Publishing" confirmation prompt 806 displayed (FIG. 80).

Item 79-4. Upon successful completion of the Publish section requirements validation and publishing condition report function the condition report data is stored and published to cloud based infrastructure (e.g., cloud based infrastructure 940 shown in FIG. 82), external to the user device, where the final completed condition report may now be accessed or viewed by public or private parties by an Internet accessible web browsing device. Acknowledge the Alert message 808 displayed (FIG. 81) in the user display indicating the condition report has been published. When the information to be contained in the condition report is published prior to completion of the publish section 79, the information is uploaded to the cloud based infrastructure and remains secret or not accessible to the end user or buyer because the end users or buyers are not provided with the uniform resource locator associated with each piece of uploaded information. Additionally, the uploaded information is not aggregated into a single file for convenient viewing by the buyer or end user. Upon completion of the publish section 79, the uploaded information is aggregated into one or more files that the end user can view and/or download. The end user or buyer may be provided with a link to the file accessible over the Internet that combines all of the uploaded information so that the buyer or end user can access (e.g., view or download) the file.

Item 79-5. The Edit Condition Report window will close automatically and a display screen view of recent condition reports (FIG. 3) for the current user will be displayed.

Item 79-6. The Condition Report process has now been completed, in accordance with the present embodiment.

Although embodiments have been described in detail with reference to the accompanying drawings for the purpose of illustration and description, it is to be understood that the disclosed processes and apparatus are not to be construed as limited thereby. It will be apparent to those of ordinary skill in the art that various modifications to the foregoing embodiments may be made without departing from the scope of the disclosure.

What is claimed is:

1. A method comprising:
receiving vehicle identification information from a mobile device;
performing a vehicle identification process using the vehicle identification information, wherein the vehicle identification process comprises identifying a manufacturer of a vehicle;
sending one or more unique characteristics that distinguish each vehicle model, when it is determined that the manufacturer of the vehicle introduced multiple vehicle models;
constructing a plurality of condition report sections, for a specific model as identified by one or more unique characteristics, when user input indicative of a selection of the one or more unique characteristics has been received.

2. The method of claim 1, wherein the receiving vehicle identification information comprises receiving a vehicle identification number (VIN).

3. The method of claim 2, wherein the receiving the VIN comprises receiving the VIN that has been rendered by a VIN reader.

4. The method of claim 3, wherein the constructing the plurality of condition report sections comprises constructing a general information section, an images section, and a paint meter section.

5. The method of claim 4, further comprising receiving at least one image for the images section.

6. The method of claim 5, further comprising uploading the at least one image to a condition report images database residing in a cloud based server service and infrastructure.

7. A method comprising:
receiving vehicle identification information, wherein the vehicle identification information comprises identifying a manufacturer of a vehicle;
sending only one or more unique characteristics that distinguish each vehicle model when it is determined that the manufacturer of the vehicle introduced multiple vehicle models;
ascertaining a specific vehicle model when user input indicative of a selection of the one or more unique characteristics has been received.

8. The method of claim 7, wherein the receiving vehicle identification information comprises receiving a vehicle identification number (VIN).

9. The method of claim 8, wherein the receiving the VIN comprises receiving the VIN that has been rendered by a VIN reader.

10. The method of claim 9, further comprises constructing a general information section, an images section, and a paint meter section.

11. The method of claim 10, further comprising receiving at least one image for the images section.

12. The method of claim 11, further comprising uploading the at least one image to a condition report images database residing in a cloud based server service and infrastructure.

13. A method comprising:
sending vehicle identification information, wherein the vehicle identification information comprises identifying a manufacturer of a vehicle;
receiving only one or more unique characteristics that are specific to individual vehicle models;
sending a selection of the one or more unique characteristics;
receiving a vehicle model.

14. The method of claim 13, wherein the sending vehicle identification information comprises receiving a vehicle identification number (VIN).

15. The method of claim 14 wherein the sending the VIN comprises sending the VIN that has been rendered by a VIN reader.

16. The method of claim 13, further comprising uploading at least one image to a cloud based server service and infrastructure.

* * * * *